US008453169B2

(12) United States Patent (10) Patent No.: US 8,453,169 B2
Uchida et al. (45) Date of Patent: May 28, 2013

(54) VIDEO OUTPUT DEVICE AND VIDEO OUTPUT METHOD

(75) Inventors: Hiroaki Uchida, Fussa (JP); Shinichi Noie, Fussa (JP); Nobuhiko Shimoe, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 13/232,785

(22) Filed: Sep. 14, 2011

(65) Prior Publication Data

US 2012/0167127 A1 Jun. 28, 2012

(30) Foreign Application Priority Data

Dec. 27, 2010 (JP) ................................. 2010-290813

(51) Int. Cl.
*H04H 60/32* (2008.01)
*G06F 3/00* (2006.01)
(52) U.S. Cl.
USPC .................... 725/14; 725/45; 725/46; 725/53
(58) Field of Classification Search
None
See application file for complete search history.

(56) References Cited

U.S. PATENT DOCUMENTS

| 6,438,752 | B1 | 8/2002 | McClard |
| 2002/0157096 | A1 | 10/2002 | Hane et al. |
| 2005/0028207 | A1* | 2/2005 | Finseth et al. .................. 725/46 |
| 2008/0244656 | A1* | 10/2008 | Sumiyoshi et al. ............. 725/46 |
| 2009/0019488 | A1* | 1/2009 | Ruiz-Velasco et al. ......... 725/43 |
| 2010/0257601 | A1* | 10/2010 | Bolyukh et al. ................ 726/16 |

FOREIGN PATENT DOCUMENTS

| EP | 1928170 | 6/2008 |
| JP | 2003-219287 | 7/2003 |
| JP | 2004-235847 | 8/2004 |
| JP | 2006-100881 | 4/2006 |
| JP | 2006-324809 | 11/2006 |
| JP | 2009-094702 | 4/2009 |
| JP | 2009-152719 | 7/2009 |
| WO | WO 2009-067670 | 5/2009 |
| WO | 2009068675 | 6/2009 |

OTHER PUBLICATIONS

European Application No./Patent No. 11181562.7-2202, Extended European Search Report, mailed Dec. 5, 2011.
Japanese Patent Application No. 2010-290813; Notice of Reasons for Rejection; Mailed Nov. 1, 2011 (English translation).

* cited by examiner

*Primary Examiner* — Brian Pendleton
*Assistant Examiner* — Jason K Lin
(74) *Attorney, Agent, or Firm* — Blakely, Sokoloff, Taylor & Zafman LLP

(57) ABSTRACT

According to one embodiment, a video output device includes a receiver, a program guide obtaining module, an output signal processor, a user identification module, a view history storage module, and a program advice module. The receiver receives a broadcast signal of a program. The program guide obtaining module obtains program guide data. The output signal processor outputs a video signal of the broadcast signal to an output module. The user identification module identifies a user who is viewing the program. The view history storage module stores the program as view history in association with the user. The program advice module searches the program guide data for a recommended program similar to programs viewed by the user in the past using a keyword based on the view history and creates a program advice message suggesting the recommended program. The output signal processor outputs the program advice message to the output module.

11 Claims, 22 Drawing Sheets

FIG.25
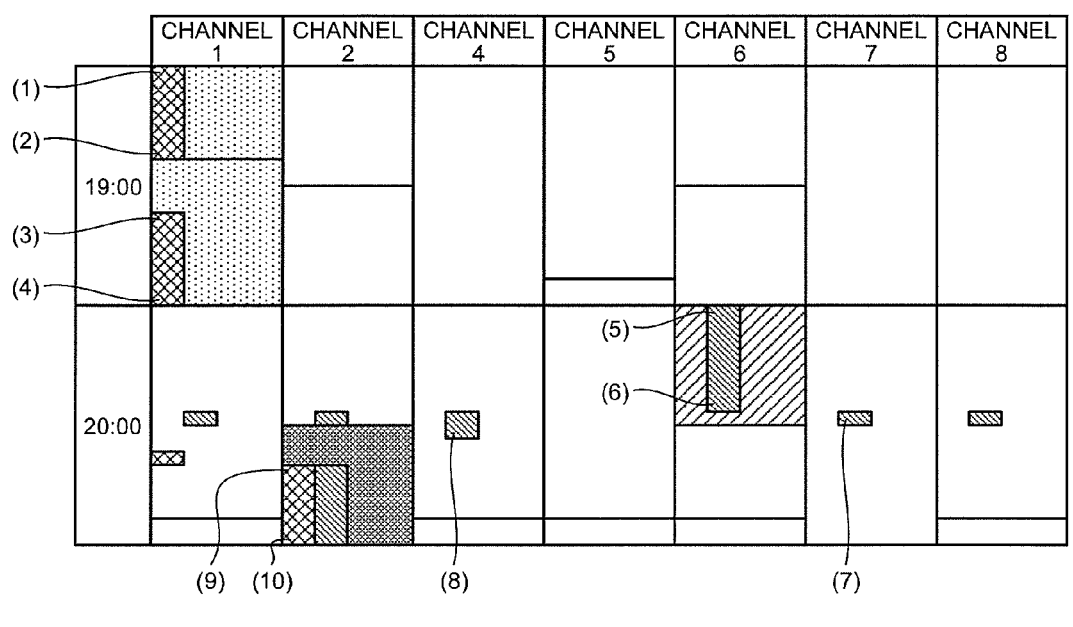
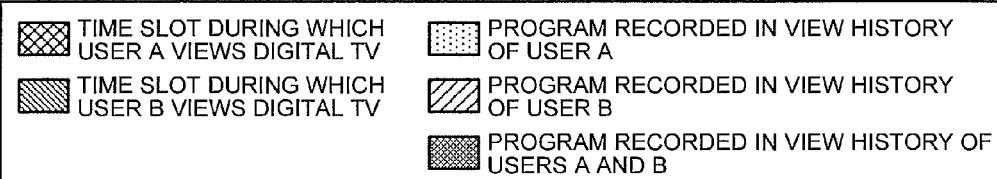

FIG.26
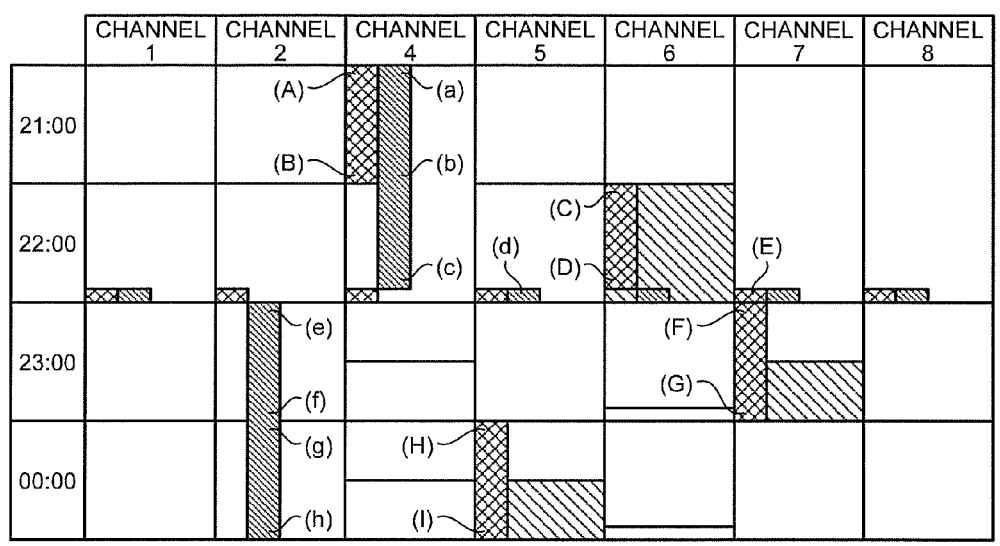
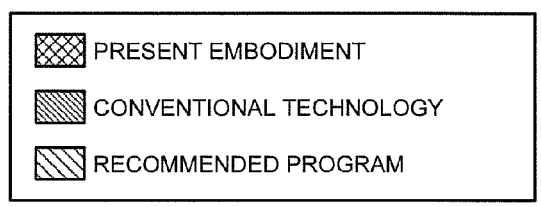

VIDEO OUTPUT DEVICE AND VIDEO OUTPUT METHOD

CROSS-REFERENCE TO RELATED APPLICATIONS

This application is based upon and claims the benefit of priority from Japanese Patent Application No. 2010-290813, filed Dec. 27, 2010, the entire contents of which are incorporated herein by reference.

FIELD

Embodiments described herein relate generally to a video output device and a video output method.

BACKGROUND

Video output devices such as digital televisions have various functions to prevent the user from missing a program that he/she wishes to view. Such functions include timer recording on/off function, automatic recording function based on a specified category or keyword, and the like.

Any of the above functions requires setting operation. Accordingly, for those who feel it bothersome to perform the setting operation or those who cannot remember the setting operation, it is desirable that there be a function of preventing them from missing a desired program without the setting operation.

There has been proposed a conventional technology in which, after a user views a particular program, it is estimated which program the user views next according to user's view history and preference, and the channel is automatically changed to the program.

With the conventional technology, there is a case that the user misses a program that he/she wishes to view, and further improvement is required.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 25 is an exemplary schematic diagram for explaining the operation and the action of the users A and B illustrated in FIGS. 19, 20, 23, and 24 in the embodiment; and FIG. 26 is an exemplary schematic diagram for explaining the difference in viewing a program on the digital TV between the operation of the embodiment and that of a conventional technology.

DETAILED DESCRIPTION

In general, according to one embodiment, a video output device comprises a receiver, a program guide obtaining module, an output signal processor, a user identification module, a view history storage module, and a program advice module. The receiver is configured to receive a broadcast signal of a program. The program guide obtaining module is configured to obtain program guide data as event information related to the program. The output signal processor is configured to output a video signal of the program obtained by processing the broadcast signal received by the receiver to an output module. The user identification module is configured to identify a user who is viewing the program output to the output module from external environmental information. The view history storage module is configured to store the program as view history in association with the user identified by the user identification module. The program advice module is configured to search the program guide data obtained by the program guide obtaining module for a recommended program similar to programs viewed by the user in the past using a keyword based on the view history stored in the view history storage module in association with the user who is viewing the program output to the output module, and to create a program advice message suggesting the recommended program. The output signal processor is configured to output the program advice message created by the program advice module to the output module.

Figure 1:
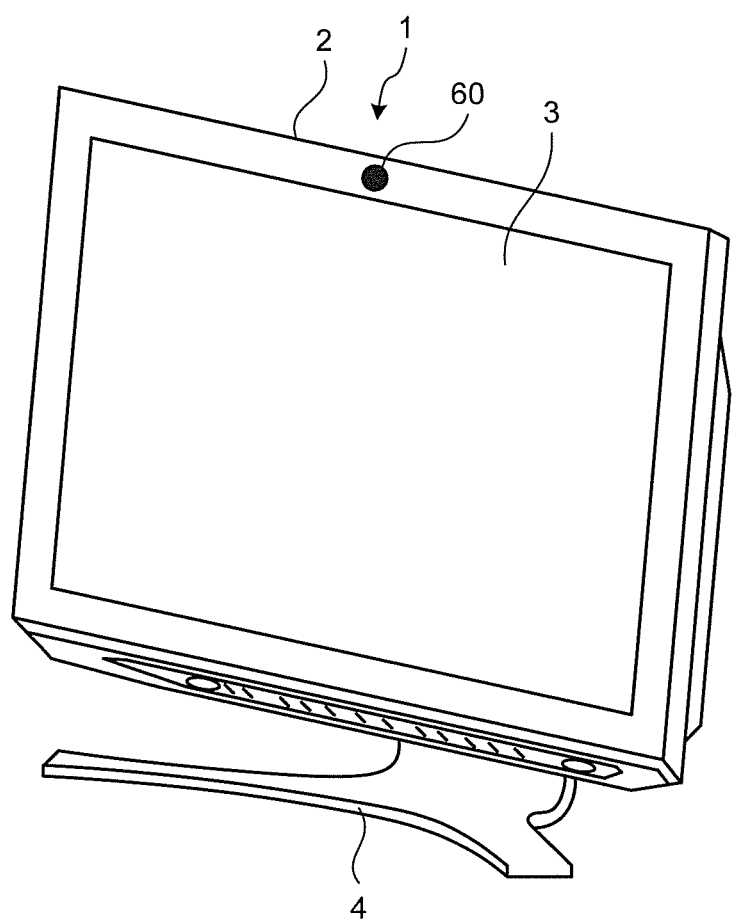
FIG. 1 is an exemplary external view of a digital television (TV) according to an embodiment.

FIG. 1 illustrates an example of the external perspective view of a digital television (TV) 1 according to an embodiment. As illustrated in FIG. 1, the digital TV1 has a rectangular appearance in the front view (in the plan view viewed from the front). The digital TV1 comprises a housing 2 and a liquid crystal display (LCD) panel 3. The LCD panel 3 receives a video signal from a video processor 20 (see FIG. 2), which will be described later, and displays video including still images and moving images. The housing 2 is supported by a base 4.

Figure 2:
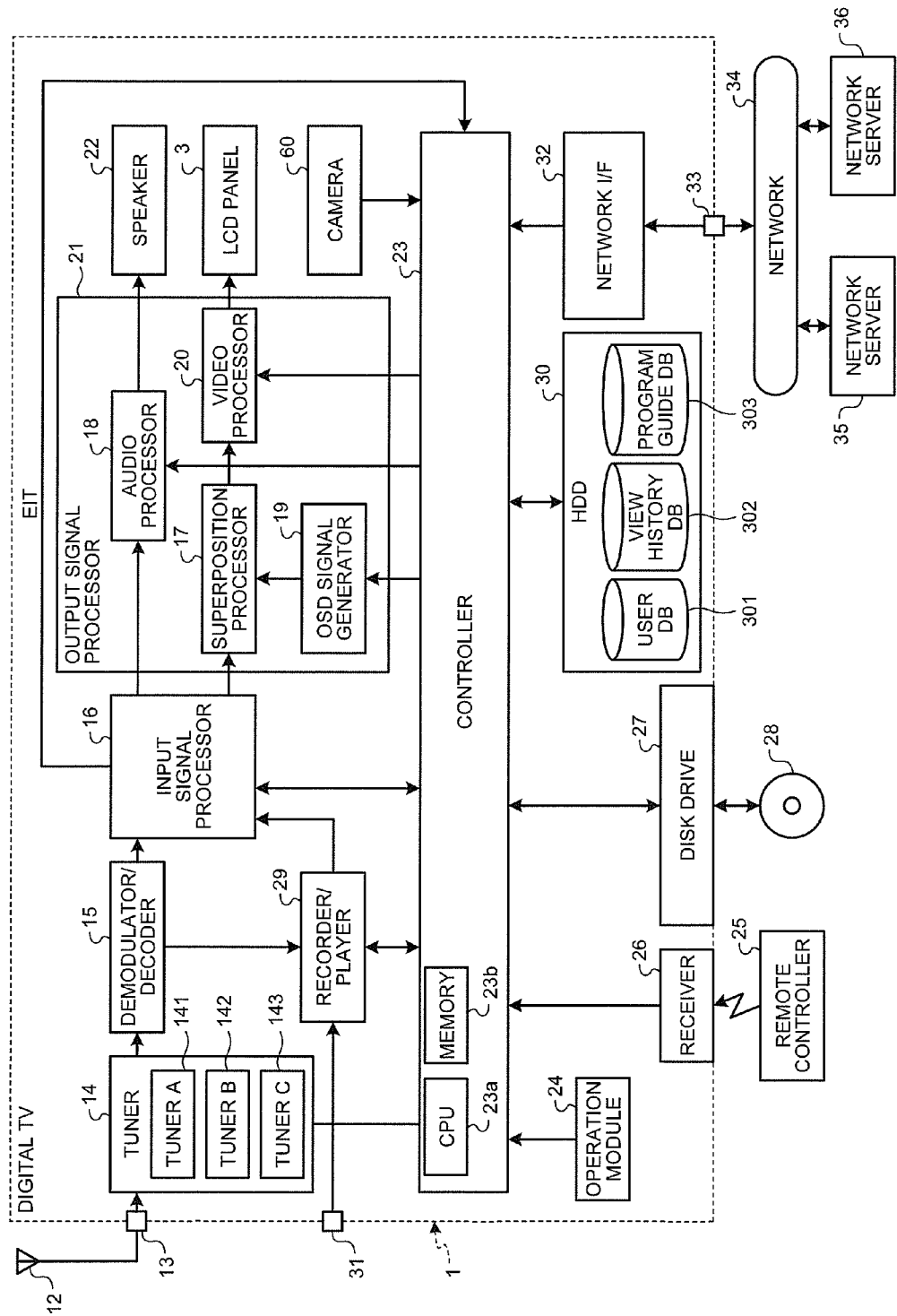
FIG. 2 is an exemplary block diagram of a signal processing system of the digital TV in the embodiment.

FIG. 2 is a block diagram of a signal processing system of the digital TV1. The digital TV1 is capable of video output based on a video signal for ordinary planar (two-dimensional) display as well as video output based on a video signal for stereoscopic (three-dimensional) display.

As illustrated in FIG. 2, the digital TV1 outputs a digital TV broadcast signal received by an antenna 12 via an input terminal 13 to a tuner 14 as a receiver, at which a broadcast signal of a desired channel can be selected. The digital TV1 outputs the broadcast signal on a channel selected by the tuner 14 to a demodulator/decoder 15. The demodulator/decoder 15 decodes the broadcast signal into a digital video signal, a digital audio signal, and the like, and then outputs the signals to an input signal processor 16. Incidentally, the digital TV1 will be described by way of example as comprising three tuners as receivers to receive digital TV broadcast signals. That is, the tuner 14 includes two tuners, i.e., a tuner A 141 and a tuner B 142, for receiving digital terrestrial broadcasting, and a tuner C 143 for receiving broadcast satellite/communication satellite (BS/CS) digital broadcasting.

The input signal processor 16 performs predetermined digital signal processing on the digital video and audio signals supplied by the demodulator/decoder 15. Examples of the digital signal processing performed by the input signal processor 16 include conversion of a video signal for ordinary planar (two-dimensional) display into a video signal for stereoscopic (three-dimensional) display, conversion of a video signal for stereoscopic display into a video signal for planar display, and the like.

The input signal processor 16 extracts an event information table (EIT) from the broadcast signal on the channel selected by the tuner 14. The EIT is a table that describes event information such as the title of a program, cast, start time, and the like. The EIT extracted by the input signal processor 16 is input to a controller 23 as program guide data. The EIT contains event information related to a program such as title information of the program, category information, broadcast date and time, cast information, and the contents of the program.

The input signal processor 16 outputs the digital video signal to a superposition processor 17 and outputs the digital audio signal to an audio processor 18. On the digital video signal supplied by the input signal processor 16, the superposition processor 17 superimposes an on-screen display (OSD) signal generated by an OSD signal generator 19 and then outputs the resultant signal. The OSD signal is a superimposed video signal such as closed captions or subtitles, a graphical user interface (GUI), and OSD. In this case, if the video signal supplied by the input signal processor 16 is a video signal for ordinary planar display, the superposition processor 17 directly superimposes the original OSD signal fed from the OSD signal generator 19 on the video signal and then outputs the resultant signal. On the other hand, if the video signal supplied by the input signal processor 16 is a video signal for stereoscopic display, the superposition processor 17 performs, on the OSD signal fed from the OSD signal generator 19, signal processing for stereoscopic display corresponding to the input video signal for stereoscopic display. The superposition processor 17 then superimposes the OSD signal on the input video signal and outputs the resultant signal.

The digital TV1 feeds the digital video signal output from the superposition processor 17 to the video processor 20. The video processor 20 converts the input digital video signal into an analog video signal in a format displayable by the LCD panel 3 functioning as an output module. The digital TV1 feeds the analog video signal output from the video processor 20 to the LCD panel 3 for video display.

The audio processor 18 converts the input digital audio signal into an analog audio signal in a format reproducible by a speaker 22 functioning as an output module. The analog audio signal output from the audio processor 18 is supplied to the speaker 22 for audio playback.

As illustrated in FIG. 2, the superposition processor 17, the audio processor 18, the OSD signal generator 19, and the video processor 20 constitute an output signal processor 21.

As illustrated in FIG. 1, the digital TV1 further comprises a camera 60 near the LCD panel 3 functioning as a video output module. The camera 60 is located at a position where it can capture an image of viewer's face facing the digital TV1.

The controller 23 controls the overall operation of the digital TV1 including the various receiving operations described above. The controller 23 comprises a built-in central processing unit (CPU) 23*a* and a built-in memory 23*b*. The memory 23*b* mainly comprises a read only memory (ROM) that stores a control program to be executed by the CPU 23*a*, a random access memory (RAM) that provides a work area to the CPU 23*a*, and a nonvolatile memory that stores various types of setting information, control information, and the like.

A disk drive 27 is connected to the controller 23. The disk drive 27 allows an optical disk 28 such as a digital versatile disk (DVD) to removably inserted thereinto and has the function of reading/writing digital data with respect to the inserted optical disk 28.

Also connected to the controller 23 is a hard disk drive (HDD) 30. By storing various types of data in the hard disk, the HDD 30 functions as a user database (DB) 301, a view history DB 302, and a program guide DB 303.

Figure 3:
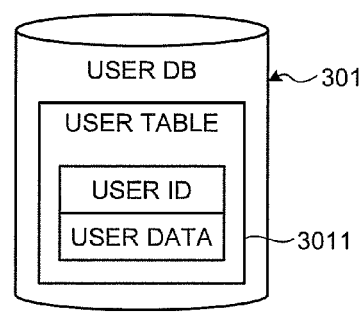
FIG. 3 is an exemplary schematic diagram of a data structure of a user database (DB) in the embodiment.

FIG. 3 illustrates an example of the data structure of the user DB 301. As illustrated in FIG. 3, the user DB 301 is an accumulating database provided with a user table 3011. The user table 3011 stores user data (face data) extracted from an image of a user by identifying the user through face recognition and ID (user ID) of the user data in association with each other.

Figure 4:
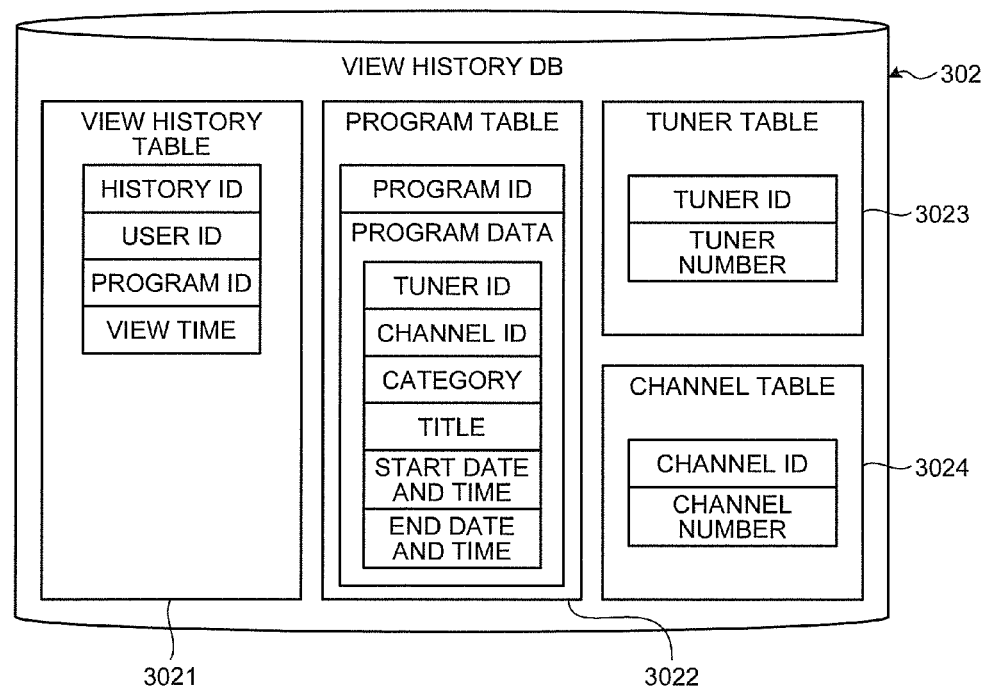
FIG. 4 is an exemplary schematic diagram of a data structure of a view history DB in the embodiment.

FIG. 4 illustrates an example of the data structure of the view history DB 302. As illustrated in FIG. 4, the view history DB 302 is an accumulating database provided with a view history table 3021, a program table 3022, a tuner table 3023, and a channel table 3024. The view history table 3021 stores, in association with history ID, user ID of a user who views a program, program ID indicating the viewed program, and view time of the program. The program table 3022 stores, in association with the program ID indicating the viewed program, program data indicating detailed information of the viewed program. The program data includes tuner ID of a used tuner, channel ID indicating a channel of the viewed program, the category of the viewed program, the title of the viewed program, the start date and time of the viewed program, and the end date and time of the viewed program. The tuner table 3023 stores a tuner number in association with the tuner ID. The channel table 3024 stores a channel number in association with the channel ID.

Figure 5:
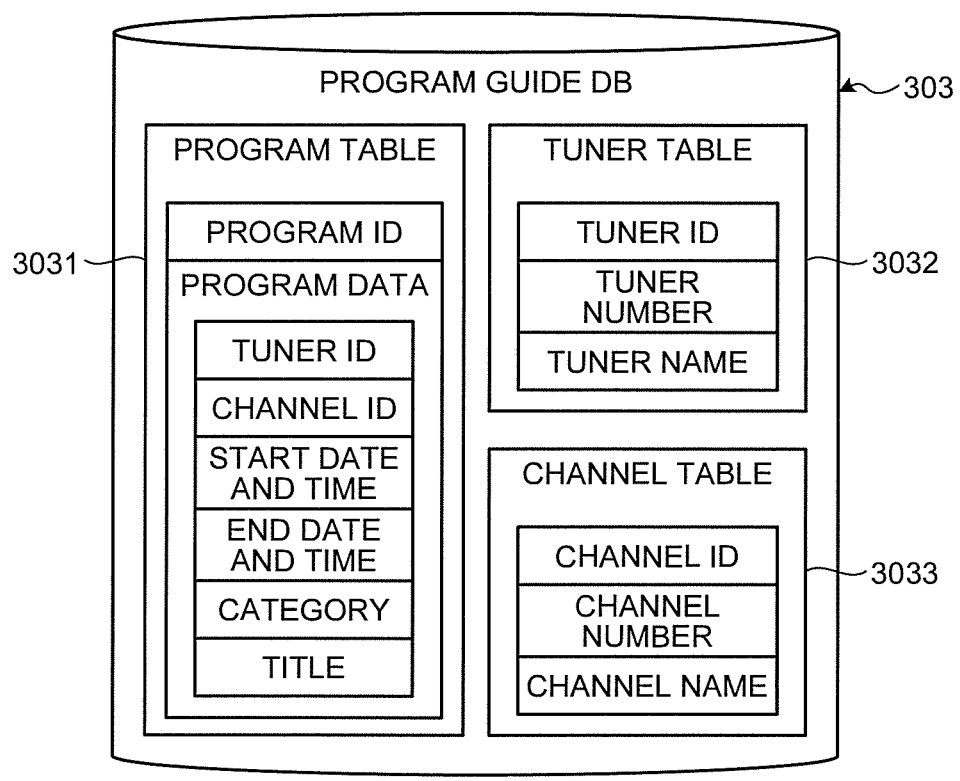
FIG. 5 is an exemplary schematic diagram of a data structure of a program guide DB in the embodiment.

FIG. 5 illustrates an example of the data structure of the program guide DB 303. As illustrated in FIG. 5, the program guide DB 303 is an updating database provided with a program table 3031, a tuner table 3032, and a channel table 3033. The program table 3031 stores, in association with program ID indicating a viewed program, program data indicating detailed information of the viewed program. The program data includes tuner ID of a used tuner, channel ID indicating a channel of the viewed program, the start date and time of the viewed program, the end date and time of the viewed program, the category of the viewed program, and the title of the viewed program. The tuner table 3032 stores a tuner number and a tuner name in association with the tuner ID. The channel table 3033 stores a channel number and a channel name in association with the channel ID.

Figure 6:
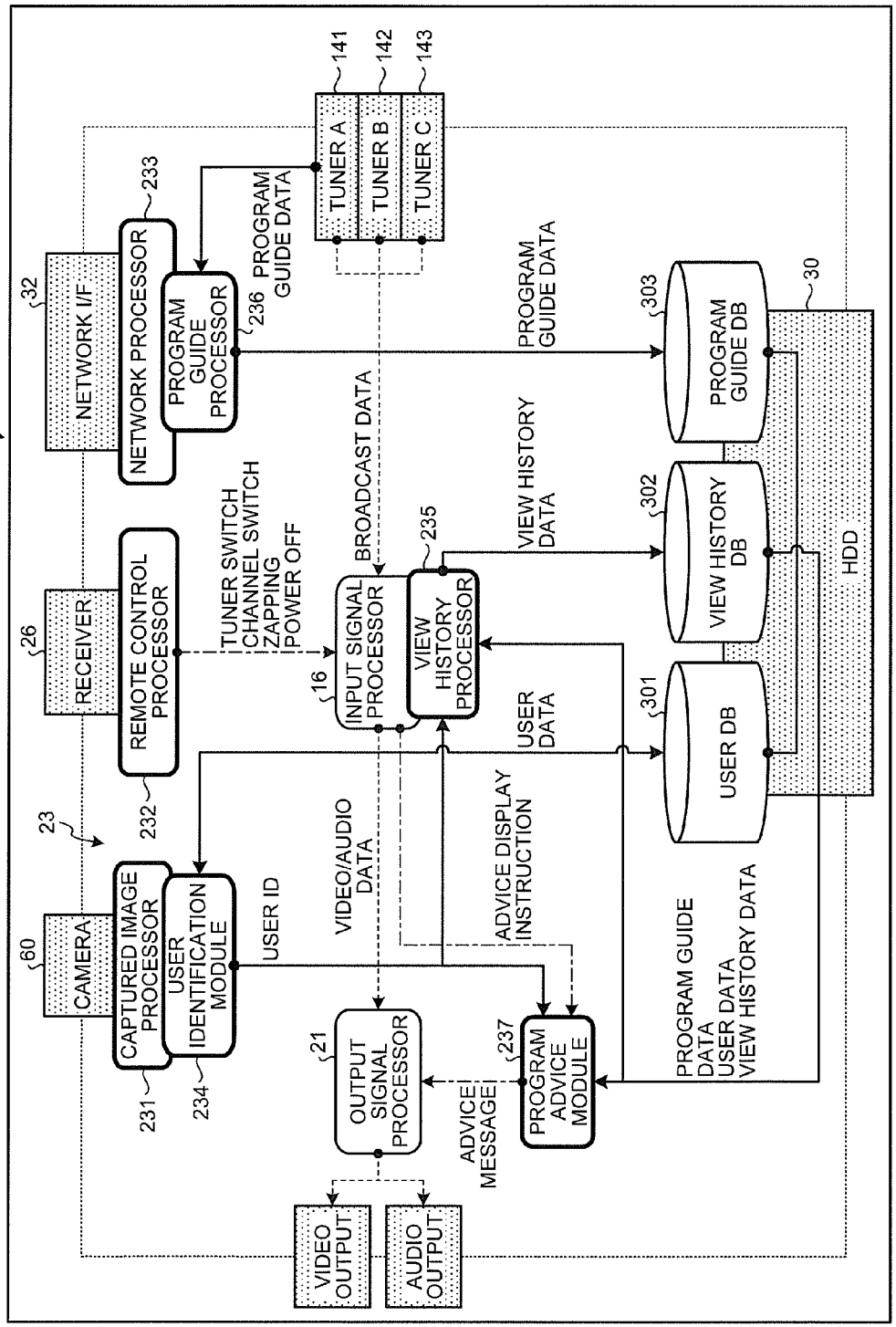
FIG. 6 is an exemplary functional block diagram of functional modules implemented by a controller in the embodiment.

As illustrated in FIG. 6, by the CPU 23a that operates according to the control program, the controller 23 implements a captured image processor 231, a remote control processor 232, a network processor 233, a user identification module 234, a view history processor 235 functioning as a view history storage module, a program guide processor 236 functioning as a program guide obtaining module, and a program advice module 237.

The network processor 233 controls communication through a network interface (I/F) 32 connected via an input/output terminal 33 to an external network 34. To the network 34, a plurality of network servers 35 and 36 (in FIG. 2, two servers) are connected to provide various types of services using communication functions via the network 34. The network processor 233 accesses a desired one of the network servers 35 and 36 and communicates information with the server via the network I/F 32, the input/output terminal 33, and the network 34, thereby using services provided by the server.

The captured image processor 231 processes an image or video captured by the camera 60. More specifically, as illustrated in FIG. 6, the digital TV1 sends an image of a user captured by the camera 60 to the user identification module 234 under the control of the captured image processor 231.

The user identification module 234 extracts user data (face data) from the image by face recognition and identifies the user by face identification. Referring to the user DB 301, if the user DB 301 stores user data (face data) that matches the extracted user data (face data), the user identification module 234 sends ID of the user data (user ID) to the view history processor 235 and the program advice module 237. If there is no user data (face data) that matches the extracted user data (face data), the user identification module 234 registers the user data (face data) in the user DB 301 and sends the user ID to the view history processor 235.

The program guide processor 236 obtains the EIT (program guide data) extracted by the input signal processor 16 and stores it in the program guide DB 303. The program guide processor 236 may obtain the EIT (program guide data) via the network 34. The program guide processor 236 obtains the EIT from a source according to user settings in the digital TV1. The program guide processor 236 has a keyword search function of the EIT (program guide data). The program guide processor 236 searches the EIT (program guide data) for programs with a specified keyword and a specified keyword matching rate or option. Thus, the program guide processor 236 can narrow down the program guide data to matching programs and stores it in the program guide DB 303.

The view history processor 235 generates view history data including tuner information, channel information, and program information regarding a program being viewed. Having determined that the program is viewed under predetermined conditions, the view history processor 235 registers the view history data in the view history DB 302.

The program advice module 237 compares, with respect to a user who is viewing a program, pieces of view history data in the view history DB 302 one by one with program guide data. The program advice module 237 then generates OSD data from program data of a recommended program obtained by the comparison. The OSD data is a message advising about programs. The program advice module 237 sends the OSD data to the OSD signal generator 19. A recommended program may be, for example, a sequel to a program viewed in the past by the user or the same type of program. The program advice module 237 performs the comparison, when activated first every day, with all program guide data on that day. After that, while a program is being viewed, the program advice module 237 performs the comparison with only program guide data within a predetermined time from the current time every minute.

The output signal processor 21 combines video data and audio data received from the input signal processor 16 with the OSD data and audio data as a program advice message created by the program advice module 237, and then outputs the respective data for video output and audio output.

The remote control processor 232 instructs the input signal processor 16 to power on/off, to switch tuners, to switch channels (including zapping to repeatedly change channels), and the like based on a remote control code received by a receiver 26 from a remote controller 25. The controller 23 receives operation information from an operation module 24 provided to the digital TV1 and controls each module according to the operation information.

For example, based on user operation on the operation module 24 or the remote controller 25, the controller 23 controls a recorder/player 29 to encode digital video and audio signals from the demodulator/decoder 15, convert the signals into a predetermined record format, and then output the signals to the HDD 30 so that the signals are stored in the hard disk.

Further, based on user operation on the operation module 24 or the remote controller 25, the controller 23 controls the HDD 30 to read digital video and audio signals from the hard disk, and controls the recorder/player 29 to decode the signals and then feed the signals to the input signal processor 16 so that the signals are output for video output and audio playback.

Besides, based on user operation on the operation module 24 or the remote controller 25, the controller 23 controls the recorder/player 29 to encode digital video and audio signals from the demodulator/decoder 15, convert the signals into a predetermined record format, and then output the signals to the disk drive 27 so that the signals are stored in the optical disk 28.

Further, based on user operation on the operation module 24 or the remote controller 25, the controller 23 controls the disk drive 27 to read digital video and audio signals from the optical disk 28, and controls the recorder/player 29 to decode the signals and then feed the signals to the input signal processor 16 so that the signals are output for video output and audio playback.

An input terminal 31 is connected to the digital TV 1. The input terminal 31 is used to directly receive digital video and audio signals from the outside of the digital TV1. Under the control of the controller 23, the digital video and audio signals received via the input terminal 31 are input to the input signal processor 16 via the recorder/player 29 and then output for video output and audio playback. Under the control of the controller 23, the digital video and audio signals received via the input terminal 31 are input to the disk drive 27 or the HDD 30 via the recorder/player 29 and then recorded on or reproduced from the optical disk 28 or the hard disk.

In addition, based on user operation on the operation module 24 or the remote controller 25, the controller 23 controls the disk drive 27 and the HDD 30 to record digital video and audio signals stored in the optical disk 28 on the hard disk or to record digital video and audio signals stored in the hard disk on the optical disk 28.

Figure 7:
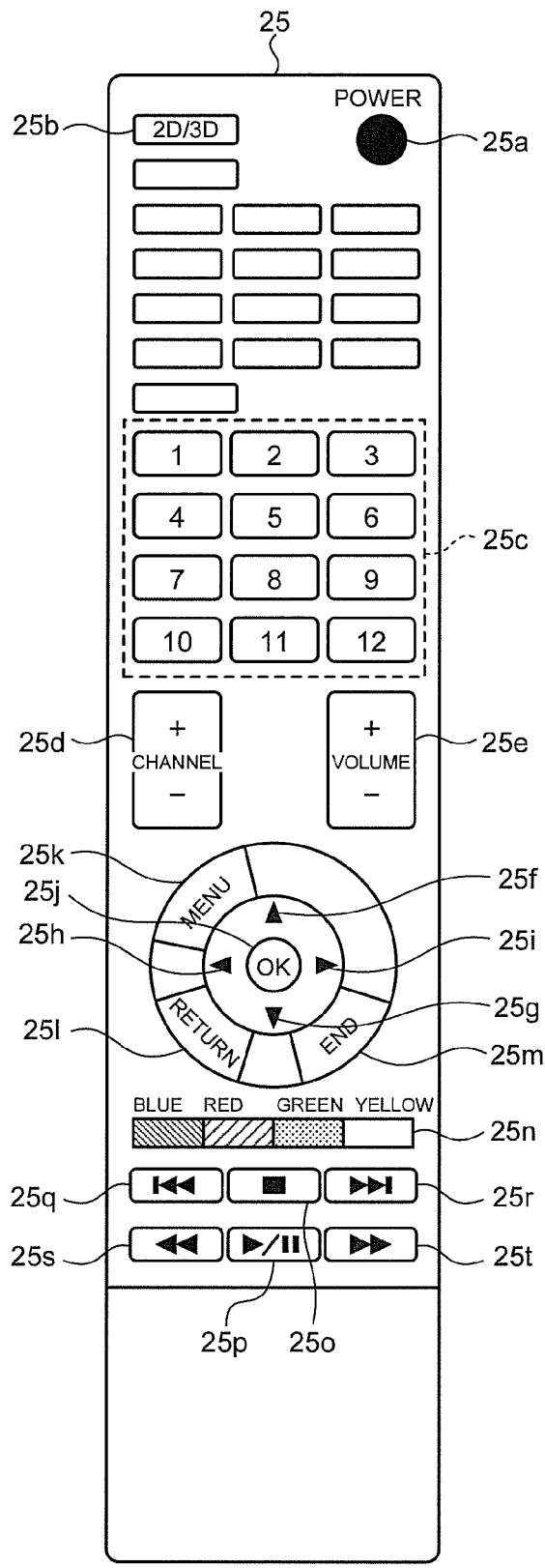
FIG. 7 an exemplary plane view of the exterior of a remote controller in the embodiment.

FIG. 7 is a plane view of an example of the exterior of the remote controller 25. As illustrated in FIG. 7, the remote controller 25 mainly comprises a power key 25a, a two dimensional/three dimensional (2D/3D) switch key 25b, numeric keys 25c, a channel up/down key 25d, a volume control key 25e, an up cursor key 25f, a down cursor key 25g, a left cursor key 25h, a right cursor key 25i, an OK key 25j, a menu key 25k, a return key 25l, an end key 25m, and color keys 25n in four colors (blue, red, green, and yellow).

The remote controller 25 further comprises a play stop key 25o, a play/pause key 25p, a backward skip key 25q, a forward skip key 25r, a fast rewind key 25s, a fast forward key 25t, and the like.

That is, the digital TV1 is capable of reproducing, stopping reproducing, and pausing reproducing information such as video and audio obtained from the disk drive 27 or the HDD 30 in response to operation on the play stop key 25o or the play/pause key 25p of the remote controller 25. Further, the digital TV1 is capable of forward skip and backward skip to skip information such as video and audio being reproduced in the disk drive 27 or the HDD 30 by a predetermined amount in the reproducing direction or the opposite direction thereto in response to operation on the backward skip key 25q or the forward skip key 25r of the remote controller 25. Still further, the digital TV1 is capable of fast-rewind reproduction and fast-forward reproduction to continuously reproduce information such as video and audio being reproduced in the disk drive 27 or the HDD 30 at a high speed in the reproducing direction or the opposite direction thereto in response to operation on the fast rewind key 25s and the fast forward key 25t of the remote controller 25.

In the following, a description will be given of the salient features of the digital TV1 as the video output device implemented by the user identification module 234, the view history processor 235, and the program advice module 237. The processes of the user identification module 234, the view history processor 235, and the program advice module 237 are performed separately.

First, user identification by the user identification module 234 will be described with reference to FIGS. 8 to 11.

Figure 8:
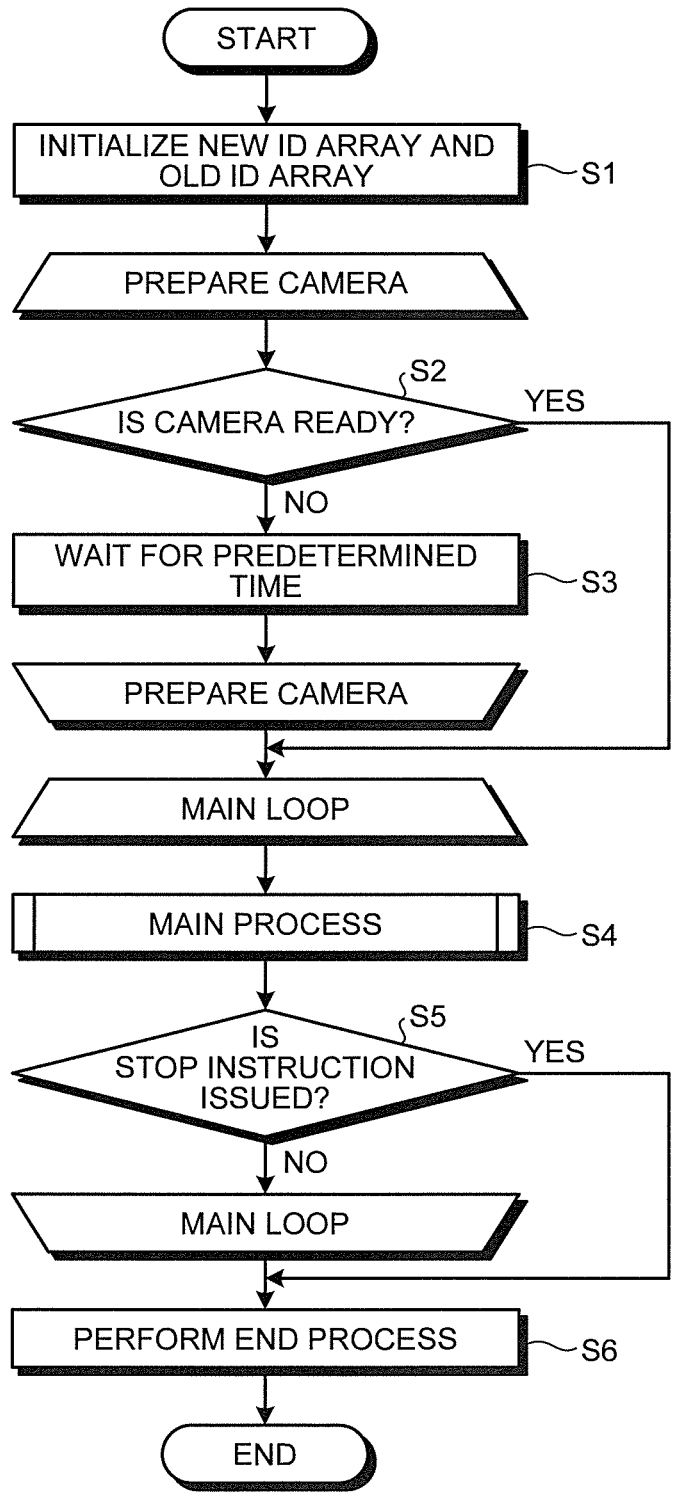
FIG. 8 is an exemplary flowchart of user identification by a user identification module in the embodiment.

As illustrated in FIG. 8, when the digital TV1 is turned on, the user identification module 234 initializes a new ID array and an old ID array, and prepares the capture of an image by the camera 60 (S1). The new ID array refers herein to an array of user IDs of users who view the digital TV1 at this point. Meanwhile, the old ID array refers herein to an array of user IDs of users who viewed the digital TV1 at a point in the past (for example, one minute before). The new ID array and the old ID array are stored in the RAM of the memory 23b.

Subsequently, the user identification module 234 waits for a predetermined time (S3) until the camera 60 is ready (Yes at S2).

If the camera 60 is ready (Yes at S2), the user identification module 234 performs main process (S4) until a stop instruction is issued by power off or the like (Yes at S5).

Figure 9:
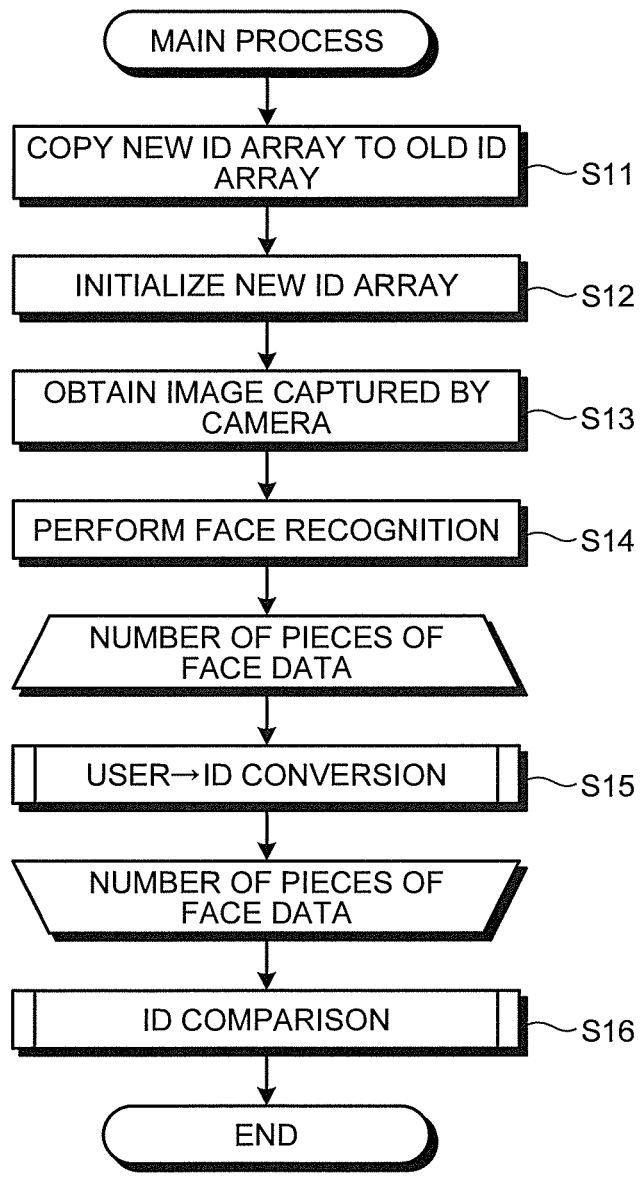
FIG. 9 is an exemplary flowchart of main process in the embodiment.

As illustrated in FIG. 9, if the camera 60 is ready (Yes at S2), the user identification module 234 copies the new ID array to the old ID array (S11), and initializes the new ID array (S12).

Thereafter, the user identification module 234 obtains an image (video) of a user captured by the camera 60 (S13). After extracting user data (face data) from the user's image (video) by face recognition (S14), the user identification module 234 performs ID conversion (S15).

Figure 10:
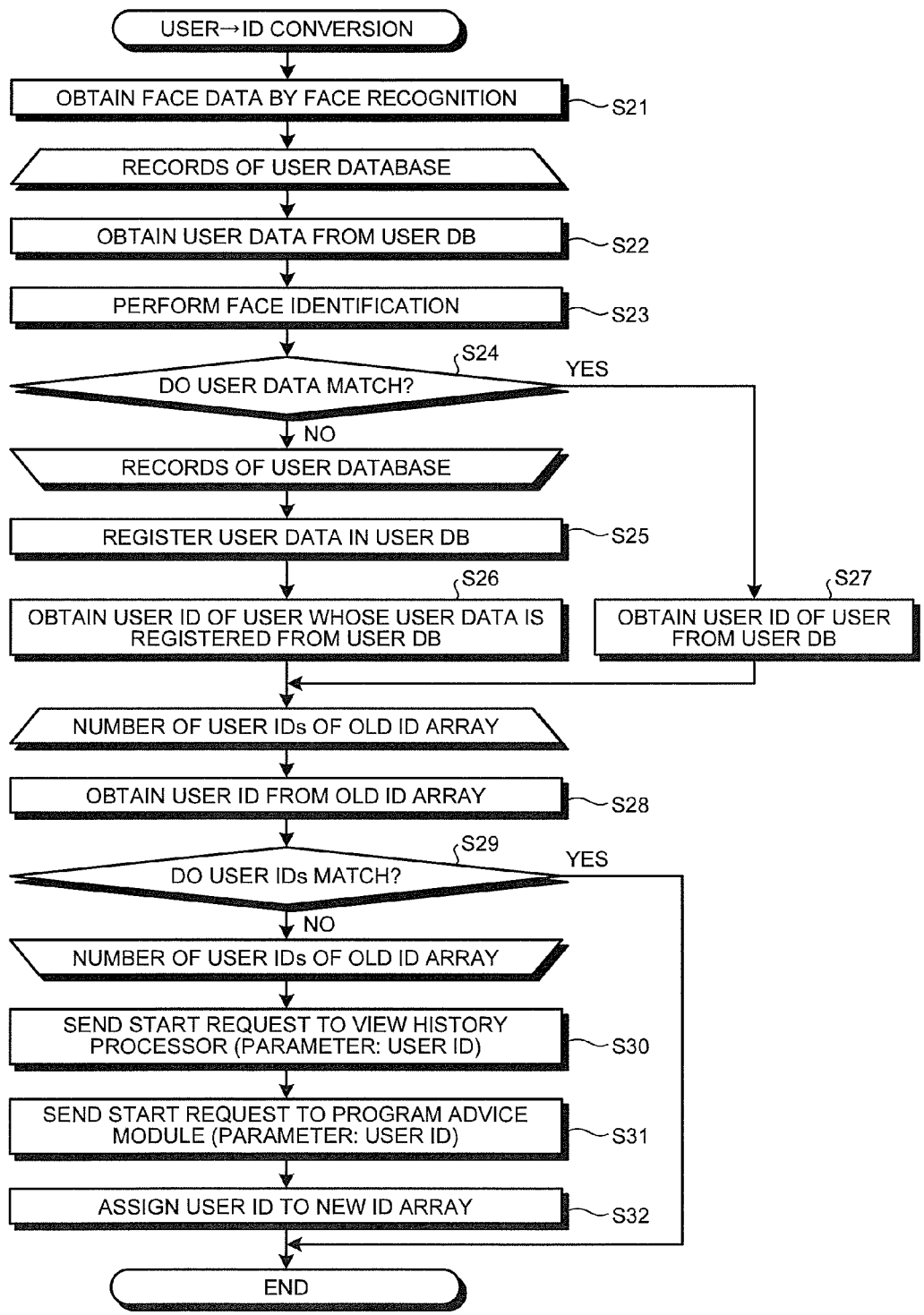
FIG. 10 is an exemplary flowchart of ID conversion in the embodiment.

As illustrated in FIG. 10, the user identification module 234 obtains the user data (face data) as a result of face recognition (S21). With respect to the obtained user data (face data), the user identification module 234 obtains pieces of user data (face data) from the user DB 301 (S22) and performs face identification on the pieces of data one by one (S23).

As a result of face identification at S23, if the user DB 301 stores no user data (face data) that matches the obtained user data (face data) (No at S24), the user identification module 234 registers the user data (face data) that the user DB 301 does not store in the user DB 301 (S25). The user identification module 234 obtains the user ID of the user whose user data (face data) is registered from the user DB 301 (S26).

On the other hand, if the user DB 301 stores user data (face data) that matches the obtained user data (face data) (Yes at S24), the user identification module 234 obtains a user ID corresponding to the user data (face data) from the user DB 301 (S27).

The user identification module 234 then obtains a user ID from the old ID array (S28). If the obtained user ID does not match the user ID obtained at S26 or S27, i.e., if the user ID obtained at S26 or S27 is ID of a user not recognized by previous user recognition (No at S29), the user identification module 234 determines that the user starts viewing the digital TV1, and sends a start request for the user ID to the view history processor 235 and the program advice module 237 (S30, S31). The user identification module 234 assigns the user ID to the new ID array (S32). In this manner, if a user who is recognized by the user identification module 234 is yet to be registered in the user DB 301, the user identification module 234 registers the user data in the user DB 301. The user identification module 234 then obtains a user ID as a key of the user data (face data) having been registered from the user DB 301. By sending the user ID as a key to the view history processor 235, the user identification module 234 causes the view history processor 235 to start view history process for the user. By sending the user ID as a key also to the program advice module 237, the user identification module 234 causes the program advice module 237 to start program advice for the user.

On the other hand, if the obtained user ID matches the user ID obtained at S26 or S27, i.e., if the user ID recognized by previous user recognition is not recognized this time (Yes at S29), the user identification module 234 directly assigns the user ID to the new ID array (S32).

Figure 11:
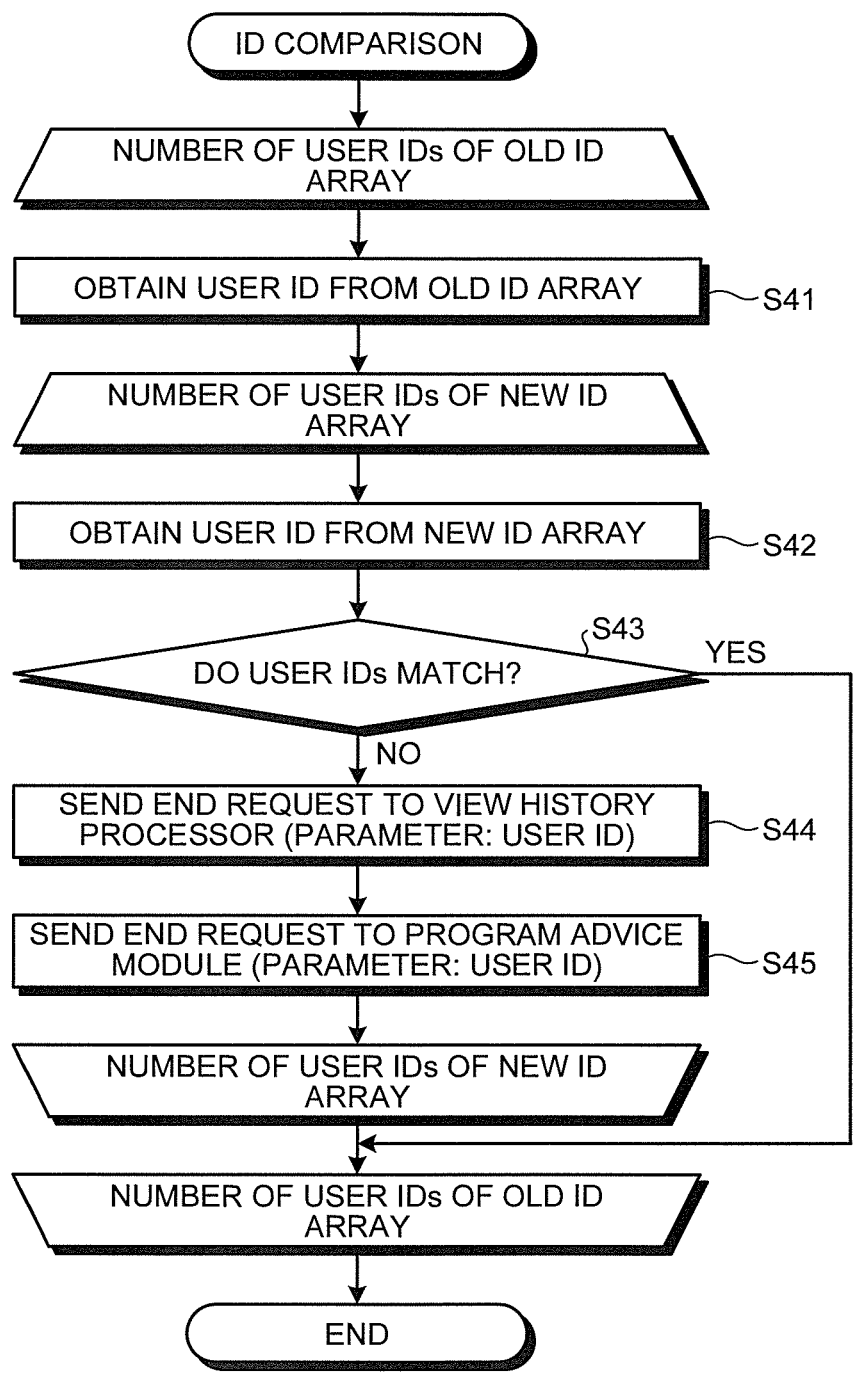
FIG. 11 is an exemplary flowchart of ID comparison in the embodiment.

Referring back to FIG. 9, upon completion of the ID conversion at S15, the user identification module 234 performs ID comparison (S16). More specifically, as illustrated in FIG. 11, the user identification module 234 obtains a user ID from the old ID array (S41), and obtains a user ID from the new ID array (S42). If the user ID recognized by previous user recognition is not recognized this time (No at S43), the user identification module 234 determines that the user finishes viewing the digital TV1, and sends an end request for the user ID to the view history processor 235 and the program advice module 237 (S44, S45). In this manner, if a user recognized previously cannot be recognized, the user identification module 234 determines that the user finishes viewing the digital TV1. By sending the user ID as a key of the user data of the user to the view history processor 235, the user identification module 234 causes the view history processor 235 to end view history process for the user. By sending the user ID as a key of the user data also to the program advice module 237, the user identification module 234 causes the program advice module 237 to finish program advice for the user.

In this manner, the user identification module 234 performs the main process (S4), and, upon receipt of a stop instruction (Yes at S5), performs the end process (S6).

As described above, in user recognition, the user identification module 234 obtains an image (video) captured by the camera 60 and performs face recognition to obtain user data (face data). The user identification module 234 checks pieces of user data (face data) in the user DB 301 one by one for face identification. If the obtained user data (face data) is not stored in the user DB 301, the user identification module 234 registers the user data (face data) in the user DB 301. The user identification module 234 obtains a user ID corresponding to the user data (face data). If the user ID is ID of a user not recognized by previous user recognition, the user identification module 234 sends a start request for the user ID to the view history processor 235 and the program advice module 237. On the other hand, if the user ID recognized by previous user recognition is not recognized this time, the user identification module 234 sends an end request for the user ID to the view history processor 235 and the program advice module 237. With this, the user identification module 234 starts creation of view history and program advice for a newly recognized user while it ends creation of view history, records the last view history, and finishes program advice for a user not recognized any more.

Next, view history process by the view history processor 235 will be described with reference to FIGS. 12 to 16.

Figure 12:
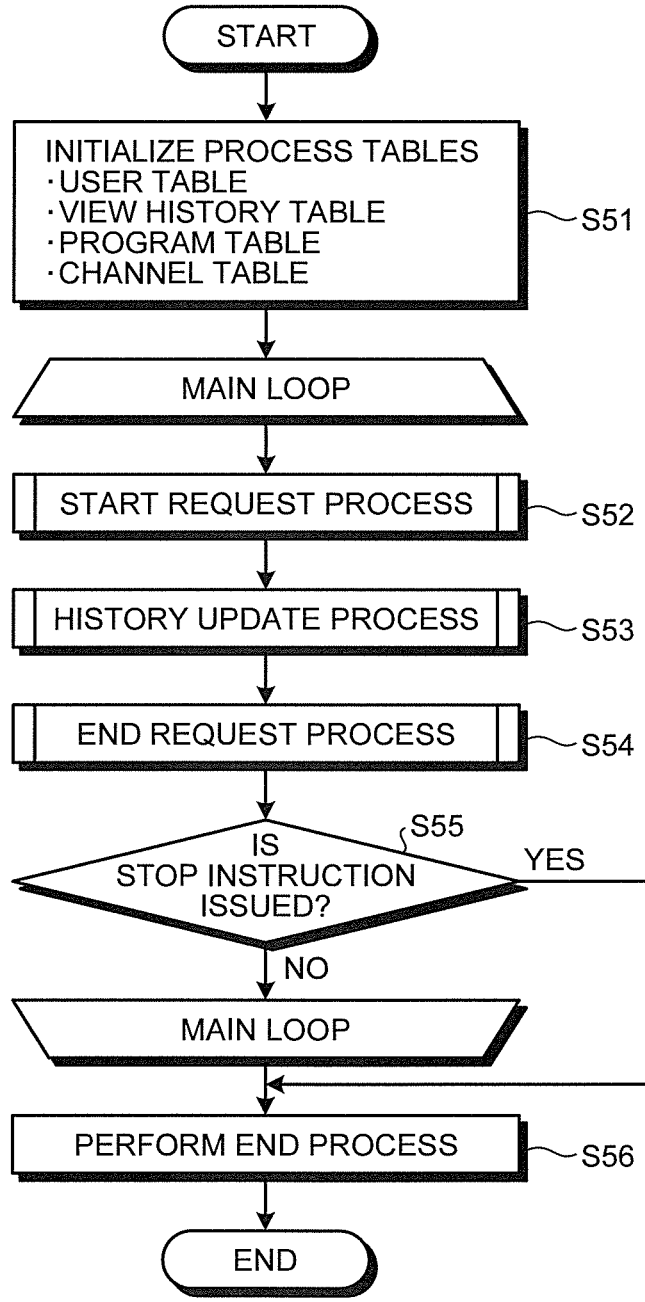
FIG. 12 is an exemplary flowchart of view history process by a view history processor in the embodiment.

As illustrated in FIG. 12, first, the view history processor 235 initializes various tables (user table, view history table, program table, channel table) in the RAM of the memory 23b (S51).

The view history processor 235 then performs start request process (S52), history update process (S53), and end request process (S54) until a stop instruction is issued (Yes at S55).

Figure 13:
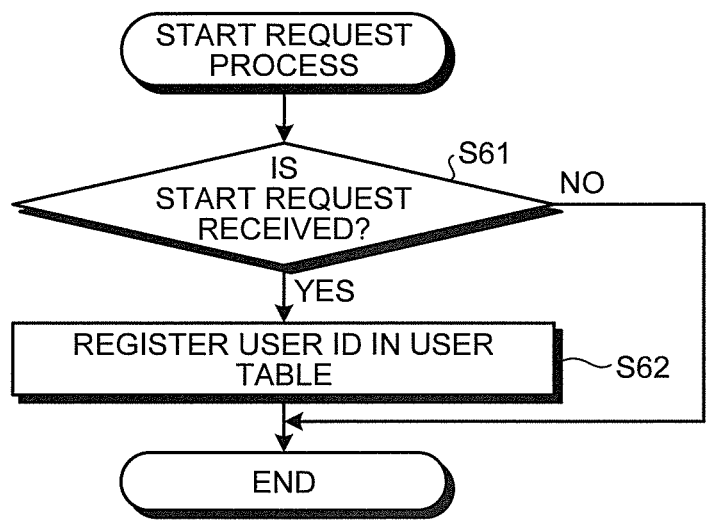
FIG. 13 is an exemplary flowchart of a start request process in the embodiment.

As illustrated in FIG. 13, if a start request is received from the user identification module 234 (Yes at S61), the view history processor 235 registers a specified user ID in the user table stored in the RAM (S64).

Figure 14:
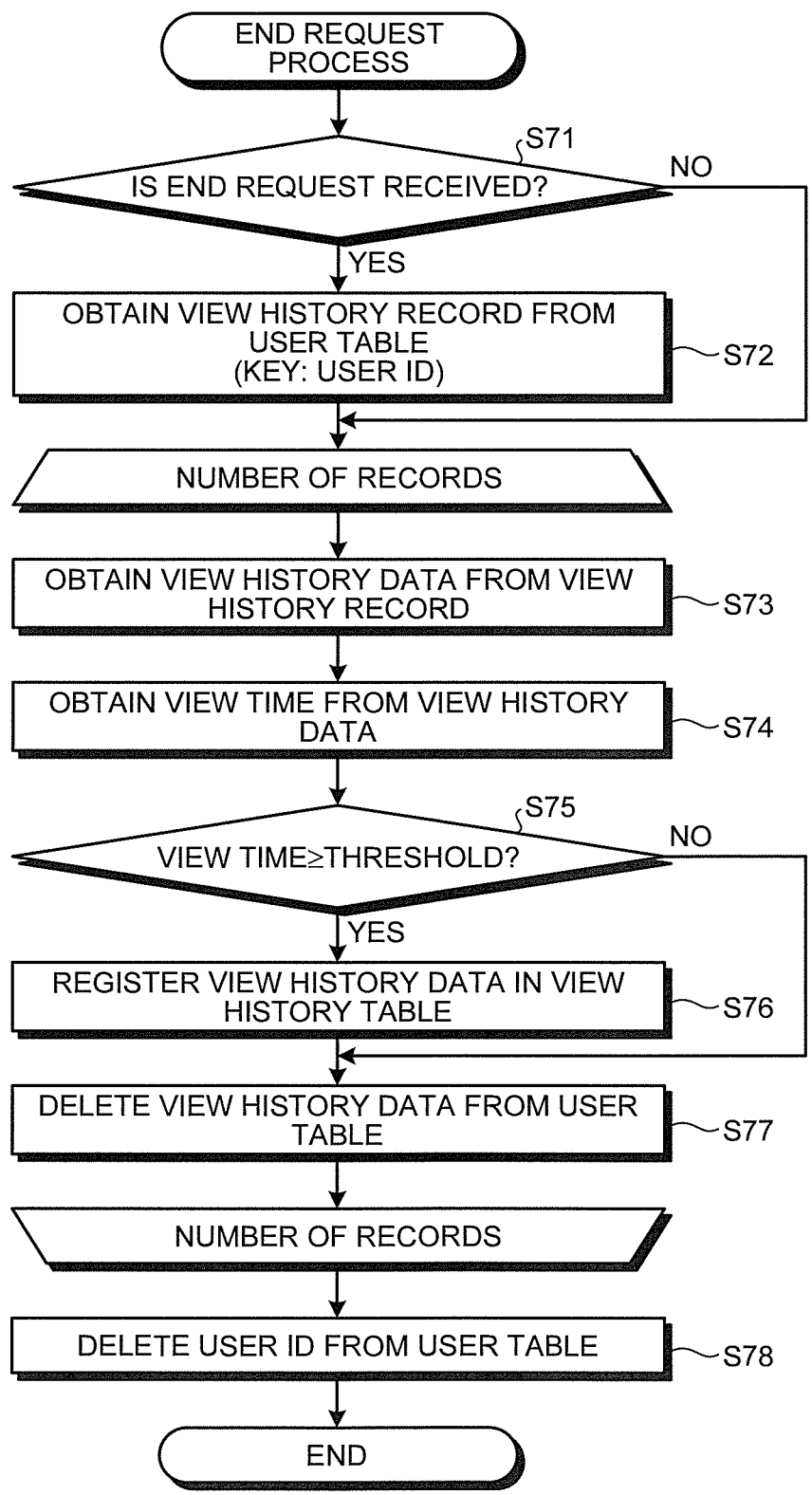
FIG. 14 is an exemplary flowchart of an end request process in the embodiment.

As illustrated in FIG. 14, if an end request is received from the user identification module 234 (Yes at S71), the view history processor 235 obtains a view history record corresponding to a specified user ID from the user table stored in the RAM (S72).

Subsequently, the view history processor 235 obtains pieces of view history data one by one from the obtained view history record (S73). Having obtained view time from the view history data (S74), the view history processor 235 determines whether the view time from the view history data is equal to or more than a threshold (S75).

If the view time from the view history data is equal to or more than the threshold (Yes at S75), the view history processor 235 records the view history data on the view history table (S76), and deletes the view history data from the user table stored in the RAM of the memory 23b (S77). On the other hand, if the view time from the view history data is less than the threshold (No at S75), the process moves to S77, and the view history processor 235 deletes the view history data from the user table stored in the RAM of the memory 23b (S77). This is performed to eliminate view history data obtained when channels are switched by zapping using the numeric keys 25c or the channel up/down key 25d on the remote controller 25.

That is, while the same user is recognized by the user identification module 234, the view history processor 235 keeps creating program view history for the user. At the time the user is not recognized, the view history processor 235 determines whether to register the program in the view history DB 302. The threshold used for the determination may be determined in advance, or may be determined from, for example, the ratio of a time period during which the program is broadcasted at the point (calculated from the program guide data and the current time) and accumulated program view time of the user (obtained from the program view history).

Having made a determination on view time for all pieces of view history data from the obtained view history record, the view history processor 235 deletes the user ID from the user table stored in the RAM of the memory 23b (S78). Then, the process ends.

Figure 15:
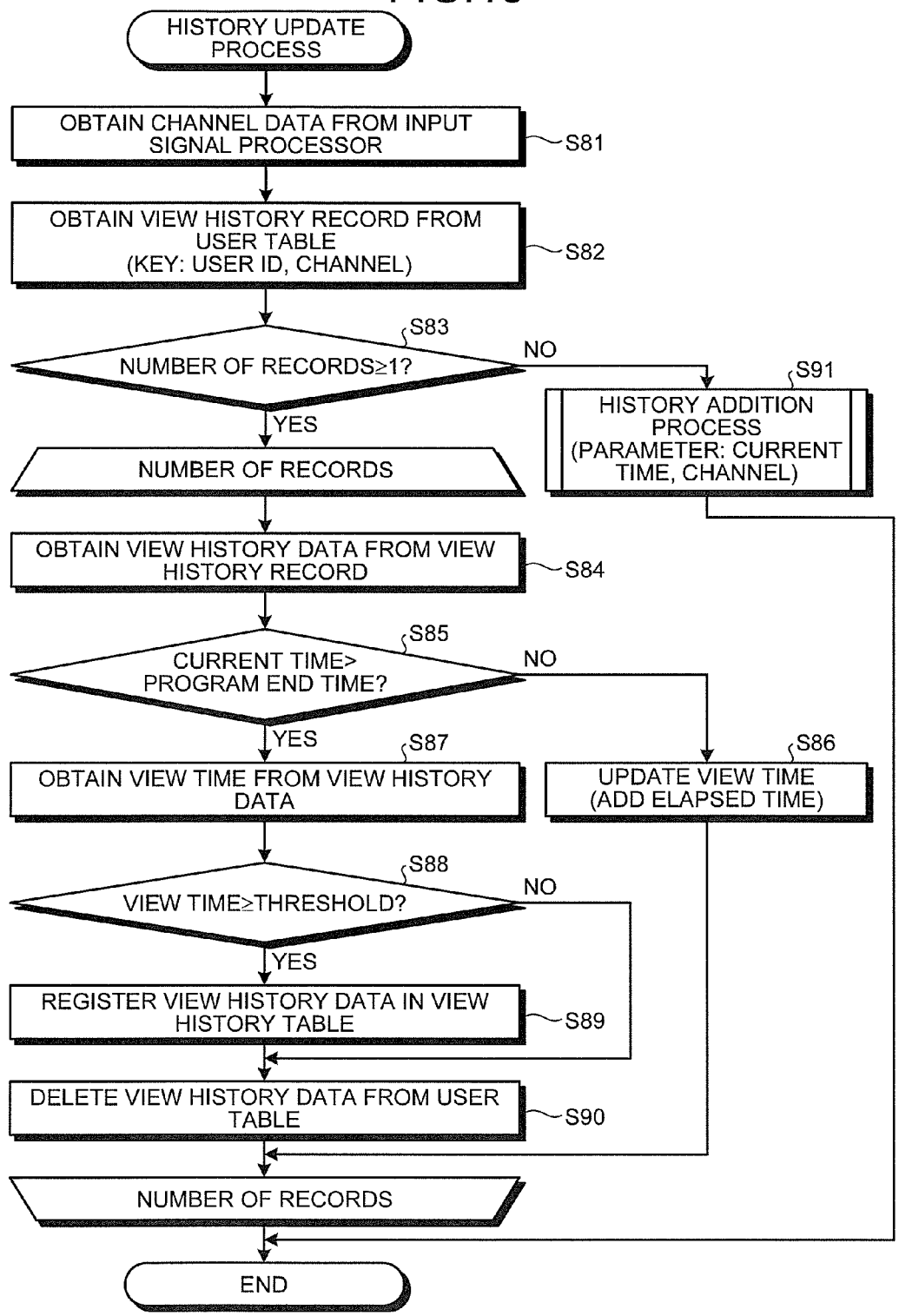
FIG. 15 is an exemplary flowchart of history update process in the embodiment.

As illustrated in FIG. 15, the view history processor 235 obtains channel data from the input signal processor 16 (S81). The view history processor 235 then obtains a view history record associated with a specified user ID and a channel from the user table stored in the RAM (S82).

Thereafter, if one or more view history records are obtained at S82, the view history processor 235 obtains pieces of view history data one by one from the obtained view history records (S84).

If the current time is not after the program end time (No at S85), the view history processor 235 updates the view time, i.e., adds the elapsed time to the view time (S86).

On the other hand, if the current time is after the program end time (Yes at S85), the view history processor 235 obtains view time from the view history data (S87), and determines whether the view time from the view history data is equal to or more than a threshold (S88). The threshold may be determined in advance, or may be determined from, for example, the ratio of the broadcast time of the program (obtained from the program guide data) and accumulated program view time of the user (obtained from the program view history).

If the view time from the view history data is equal to or more than the threshold (Yes at S88), the view history processor 235 records the view history data on the view history table (S89), and deletes the view history data from the user table stored in the RAM of the memory 23b (S90).

On the other hand, if the view time from the view history data is less than the threshold (No at S88), the process moves to S90, and the view history processor 235 deletes the view history data from the user table stored in the RAM of the memory 23b (S90). This is performed to eliminate view history data obtained when channels are switched by zapping using the numeric keys 25c or the channel up/down key 25d on the remote controller 25.

If there is no view history record (No at S83), the view history processor 235 performs history addition process based on the current time and the channel (S91).

Figure 16:
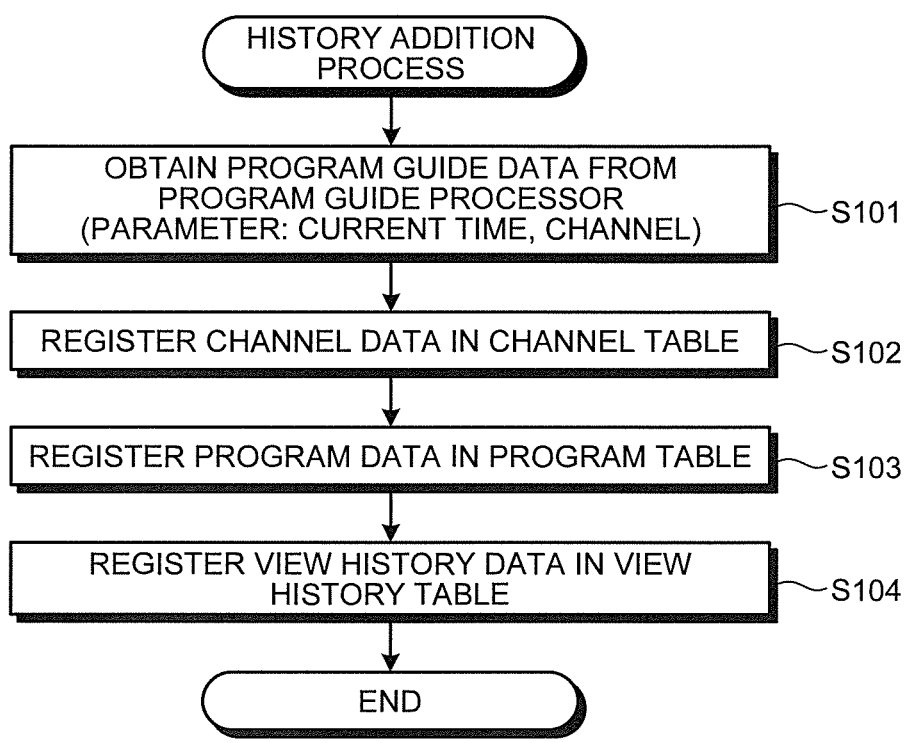
FIG. 16 is an exemplary flowchart of history addition process in the embodiment.

As illustrated in FIG. 16, the view history processor 235 obtains program guide data from the program guide processor 236 based on the current time and the channel (S101). The view history processor 235 registers channel data in the channel table (S102), registers program data in the program table (S103), and newly registers view history data in the view history table (S104).

Referring back to FIG. 12, upon receipt of a stop instruction due to power off or the like (Yes at S55), the view history processor 235 performs the end process (S56).

In this manner, if a start request is received from the user identification module 234, the view history processor 235 registers a specified user ID in the user table. On the other hand, if an end request is received from the user identification module 234, the view history processor 235 deletes all pieces of view history associated with a specified user ID. Before deleting the view history, if the view time from the view history is equal to or more than a threshold, the view history processor 235 records the view history on the view history table. After deleting all the pieces of view history, the view history processor 235 deletes the user ID from the user table. With respect to the user ID that the view history processor 235 registers in the user table, the view history processor 235 updates the view history thereof. If there is no view history, the view history processor 235 newly adds view history to the table. When detecting view history where it is past the program end time while updating the view history, if the view time from the view history is equal to or more than the threshold, the view history processor 235 records the view history on the view history table. After that, the view history processor 235 deletes the view history.

In the following, program advice process by the program advice module 237 will be described with reference to FIGS. 17 and 18. The program advice module 237 successively performs the program advice process while a program is being viewed. The program advice module 237 also performs the program advice process while a user is searching for a program to view (during zapping operation) and a user stops viewing a program (at the time of power off operation). The remote control processor 232 can detect the zapping operation and the power off operation.

Figure 17:
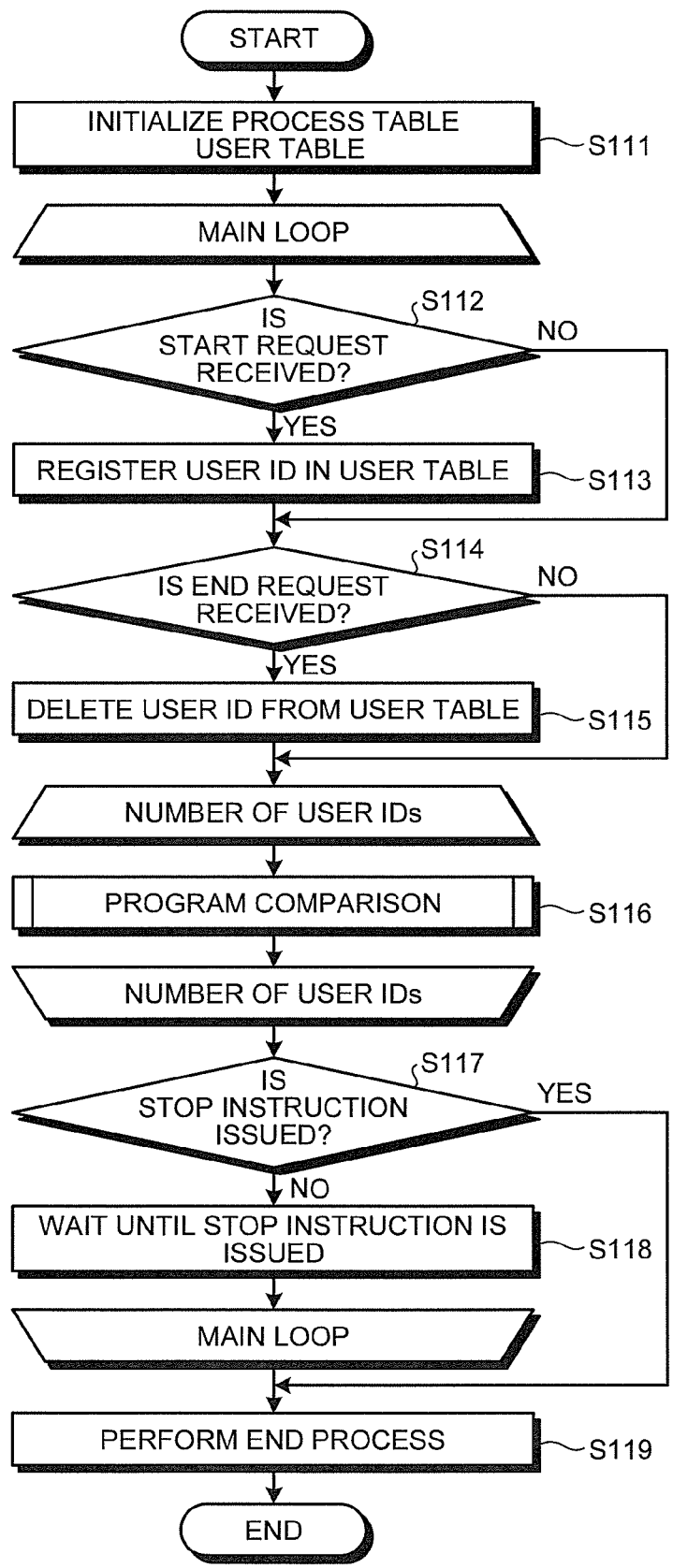
FIG. 17 is an exemplary flowchart of program advice process by a program advice module in the embodiment.

As illustrated in FIG. 17, first, the program advice module 237 initializes various tables (user table) in the RAM of the memory 23b (S111).

If a start request is received from the user identification module 234 (Yes at S112), having determined that a new user starts viewing a program, the program advice module 237 registers the user ID of a specified user (the user who starts viewing a program) in the user table stored in the RAM (S113). On the other hand, if an end request is received from the user identification module 234 (Yes at S114), having determined that a user stops viewing a program, the program advice module 237 deletes the user ID of a specified user (the user who stops viewing a program) from the user table stored in the RAM (S115).

With respect to the user ID that the program advice module 237 registers in the user table stored in the RAM, the program advice module 237 performs program comparison (S116).

That is, while the same user is recognized by the user identification module 234, the program advice module 237 keeps performing program comparison to compare program view history of the user with program guide data. At the time the user is not recognized, the program advice module 237 finishes program comparison for the user.

Figure 18:
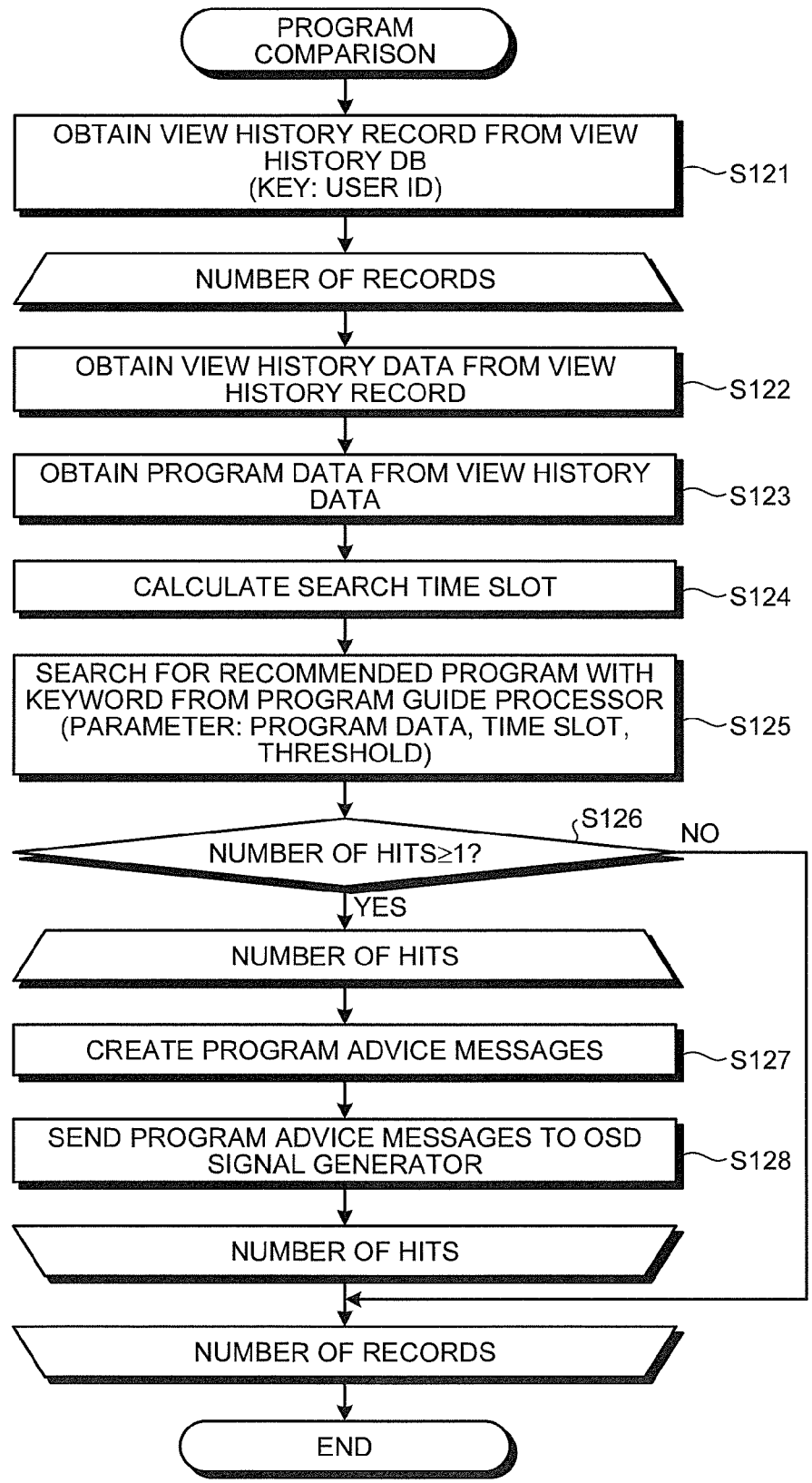
FIG. 18 is an exemplary flowchart of program comparison in the embodiment.

As illustrated in FIG. 18, the program advice module 237 obtains a view history record associated with each user ID from the view history DB 302 (S121).

Next, the program advice module 237 obtains pieces of view history data one by one from the obtained view history record (S122), thereby obtaining program data from the view history data (S123).

Besides, the program advice module 237 calculates a search time slot (S124). The search time slot refers herein to a time slot on a program guide in which keyword search is to be performed. In the embodiment, the time slot in which a similar recommended program is searched for from a program guide data varies depending on whether a program is being viewed (the broadcast time of a recommended program is coming soon after power on), a program to view is being searched for (the user is zapping), or program viewing is stopped (the user turns power off). For example, to inform the user that the broadcast time of a recommended program is coming soon after the digital TV1 is turned on, the search time slot may be about 10 minutes. To advice about a program while the user is zapping, since there may be no particular program that the user wishes to view but he/she is likely to wish to view something, it is better to set the search time slot to about one to two hours. In the case of advising about a program when the user turns power off, to prevent the user from missing a program that he/she is likely to wish to view, it is better to set the search time slot to remaining time of the day.

The program advice module 237 searches for recommended programs one by one with a keyword from the program guide processor 236 based on program data (title information, category information, cast information, etc.), the search time slot, a threshold of matching rate (S125). For example, the program advice module 237 performs keyword search on title information of the program guide data with title information of the program view history, and determines only programs whose matching rate is equal to or more than the threshold as recommended programs. For another example, the program advice module 237 performs keyword search on category information of the program guide data with category information of the program view history, and determines only programs whose matching rate is equal to or more than the threshold as recommended programs. For still another example, the program advice module 237 performs keyword search on cast information of the program guide data with cast information of the program view history, and determines only programs whose matching rate is equal to or more than the threshold as recommended programs.

If the keyword search finds one or more hits that can be considered as recommended programs (Yes at S126), the program advice module 237 creates program advice messages of the number of hits (S127), and sends the messages to the OSD signal generator 19 (S128).

Referring back to FIG. 17, upon completion of the program comparison at S116, the program advice module 237 waits (S118) until a stop instruction is issued by power off or the like (Yes at S117). Upon receipt of a stop instruction (Yes at S117), the program advice module 237 performs the end process (S119).

In this manner, if a start request is received from the user identification module 234, the program advice module 237 registers a specified user ID in the user table stored in the RAM. On the other hand, if an end request is received from the user identification module 234, the view history processor 235 deletes a specified user ID from the user table stored in the RAM. With respect to the user ID that the program advice module 237 registers in the user table stored in the RAM, the program advice module 237 obtains a view history record associated with each user ID from the view history DB 302. The program advice module 237 compares view history records one by one with program guide data. If there is found a program considered as a recommended program, the program advice module 237 displays a program advice message.

A description will be given of an example of the operation of the digital TV1.

Figure 19:
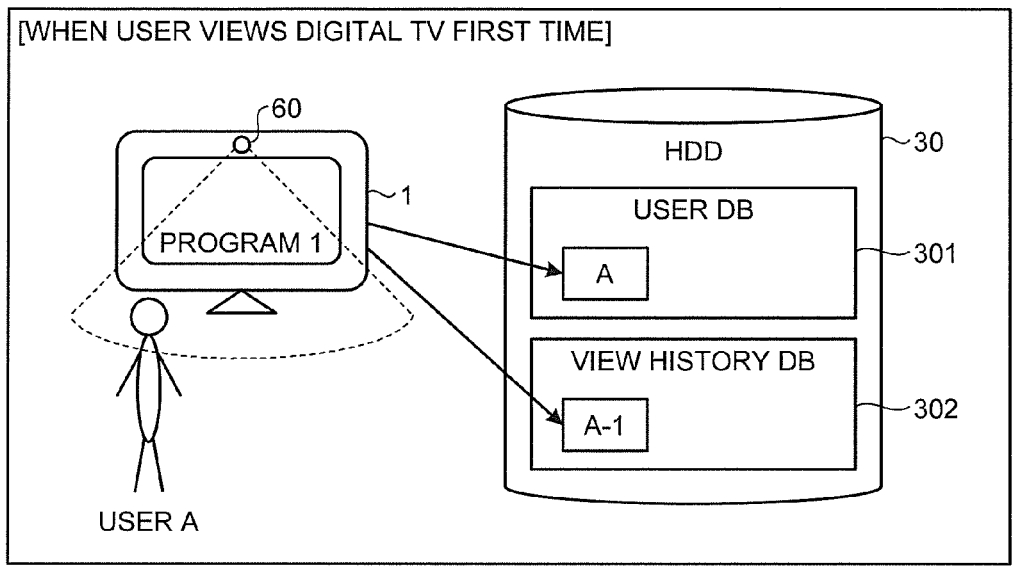
FIG. 19 is an exemplary schematic diagram for explaining the operation when a user A first views a program on the digital TV in the embodiment.

FIG. 19 is a schematic diagram for explaining the operation when a user A first views a program on the digital TV 1. As illustrated in FIG. 11, when the user A turns on the digital TV1 with the power key 25a on the remote controller 25 and starts viewing a program, the camera 60 captures an image of the user A. If the user A is yet to be registered in the user DB 301, user data of the user A is registered in the user DB 301. The digital TV1 also registers program data of a program 1 that the user A is viewing in the view history DB 302.

Figure 20:
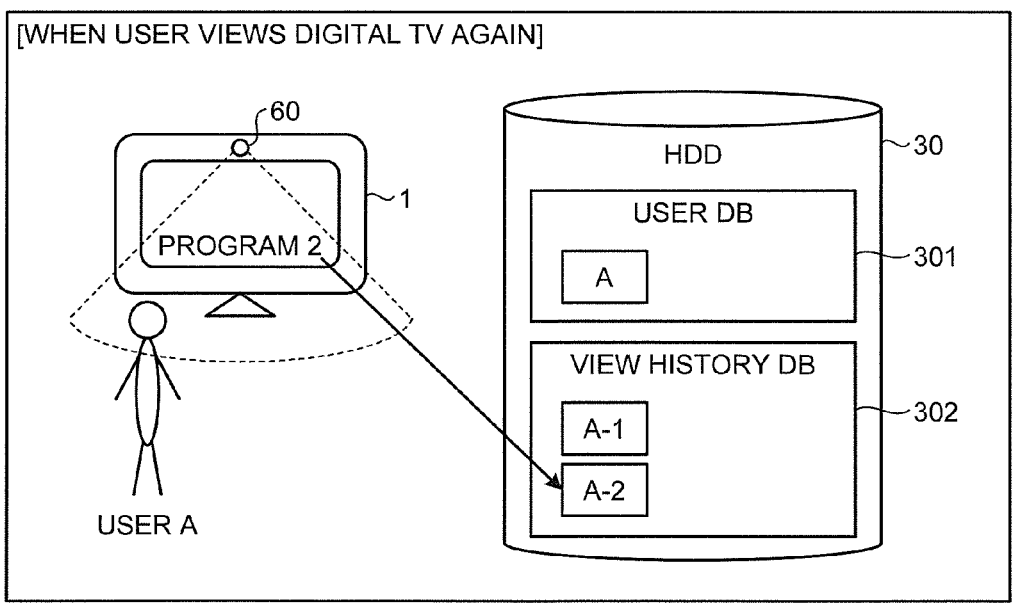
FIG. 20 is an exemplary schematic diagram for explaining the operation when the user A views a program again on the digital TV in the embodiment.

FIG. 20 is a schematic diagram for explaining the operation when the user A views the digital TV1 again. As illustrated in FIG. 20, when the user A turns on the digital TV 1 with the power key 25a on the remote controller 25 and starts viewing a program, the camera 60 captures an image of the user A. Thus, the user A is determined to be already registered in the user DB 301. The digital TV1 registers program data of a program 2 that the user A is viewing in the view history DB 302. Further, the digital TV1 searches for programs similar to those viewed by the user A in the past based on the view history DB 302. If finding a program similar to those in view history among programs currently being broadcasted or to be broadcasted soon from program guide data in the program guide DB 303, the digital TV1 displays a program advice message suggesting the program on the screen of the LCD panel 3.

Figure 21:
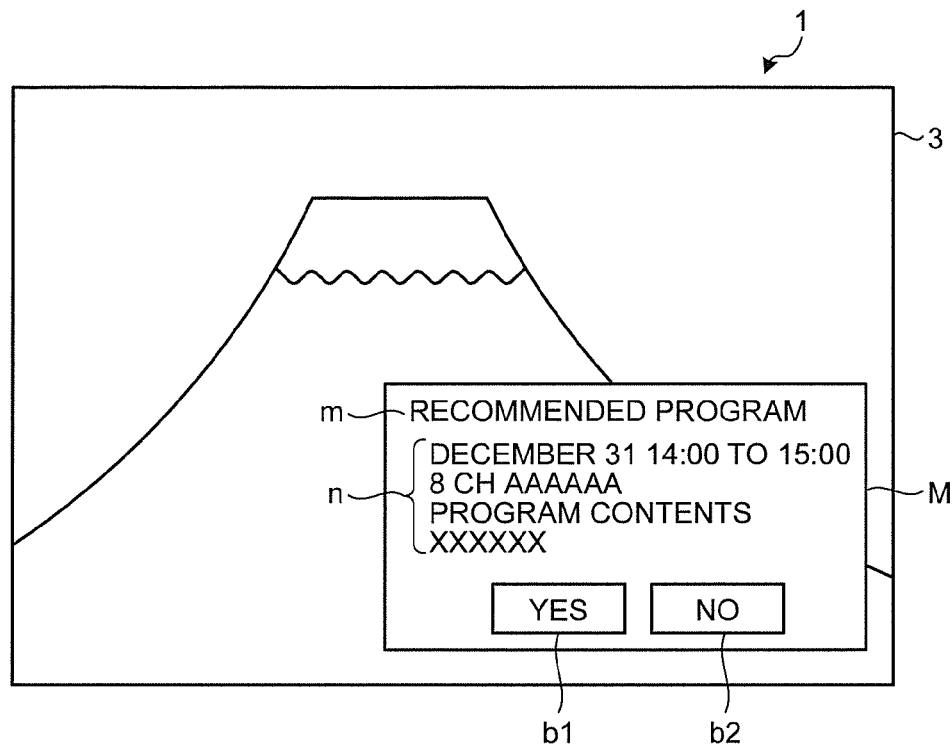
FIG. 21 is an exemplary schematic diagram of a program advice message displayed on the screen in the embodiment.

FIG. 21 illustrates an example of a program advice message M displayed on the screen. As illustrated in FIG. 21, the program advice message M is displayed on the LCD panel 3 as being overlaid on program video being viewed. The program advice message M includes a message m and details of a recommended program n (broadcast data and time, channel, title, program contents, etc.). The details of a recommended program n is obtained from the EIT (program guide data) stored in the program guide DB 303. The program advice message M also includes buttons b1 and b2 by which the user can select whether to view the recommended program. The buttons b1 and b2 can be operated by the remote controller 25.

Examples of the message m in the program advice message M include "start soon" while the user is viewing the digital TV1, "recommended program" while the user is zapping, and "recommended program is broadcasted today" when the user turns off the digital TV1.

Figure 22:
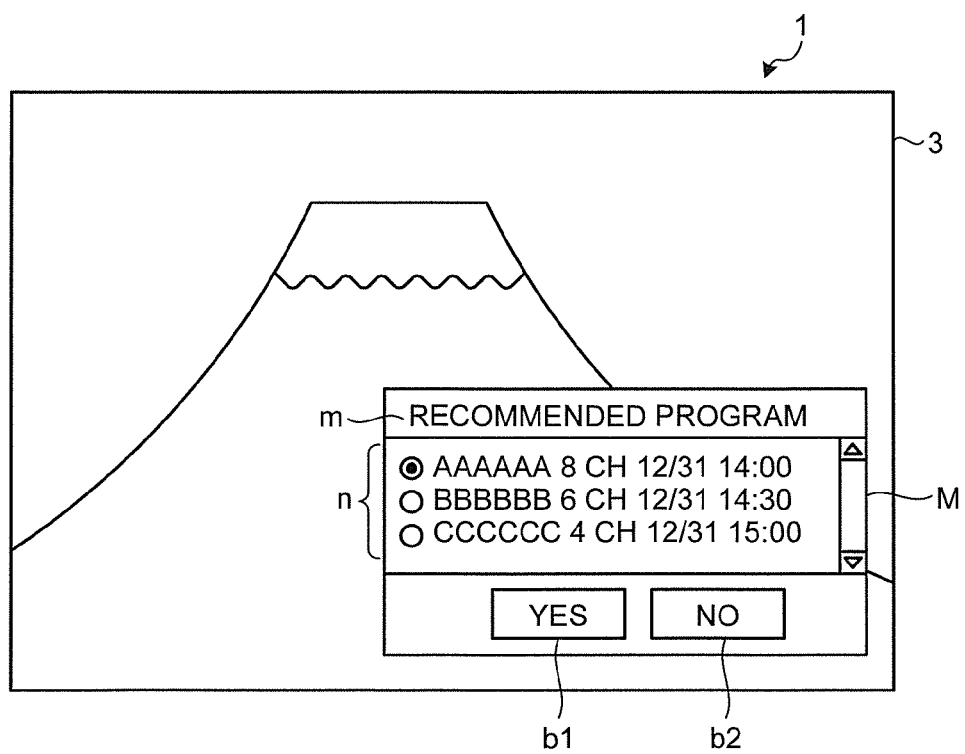
FIG. 22 is an exemplary schematic diagram of a program advice message displayed on the screen in the embodiment.

If there are a plurality of recommended programs, a plurality of program advice messages M may be sequentially displayed, or the recommended programs may be displayed in a list as illustrated in FIG. 22.

Figure 23:
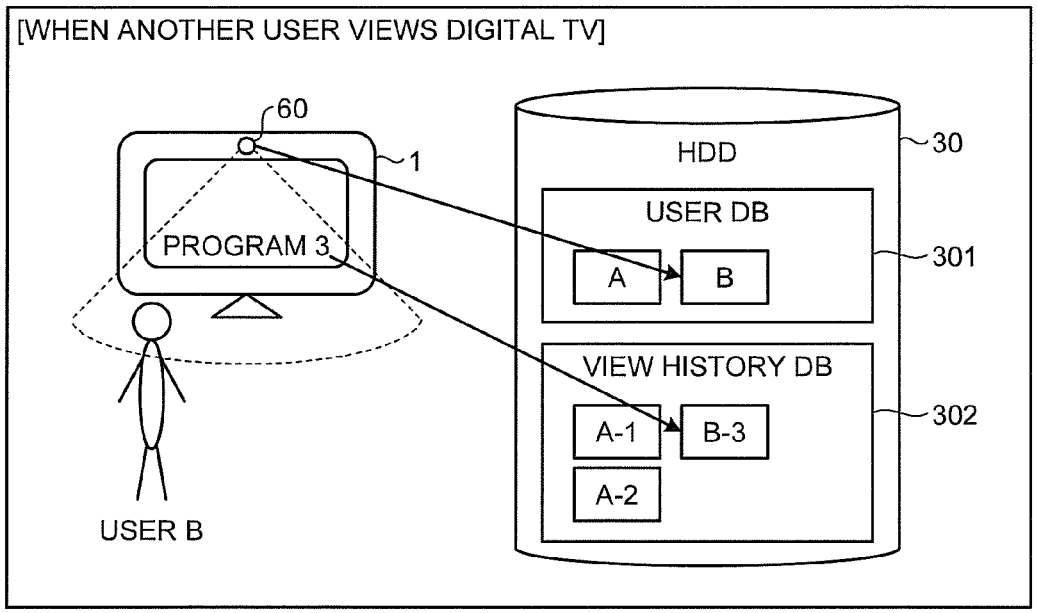
FIG. 23 is an exemplary schematic diagram for explaining the operation when a user B views a program on the digital TV after the user A in the embodiment.

FIG. 23 is a schematic diagram for explaining the operation when a user B views a program on the digital TV1 after the user A views the digital TV. As illustrated in FIG. 23, when the user B turns on the digital TV1 with the power key 25a on the remote controller 25 and starts viewing a program after the user A views the digital TV1, the camera 60 captures an image of the user B. If the user B is yet to be registered in the user DB 301, user data of the user B is registered in the user DB 301. The digital TV1 also registers program data of a program 3 that the user B is viewing in the view history DB 302.

Figure 24:
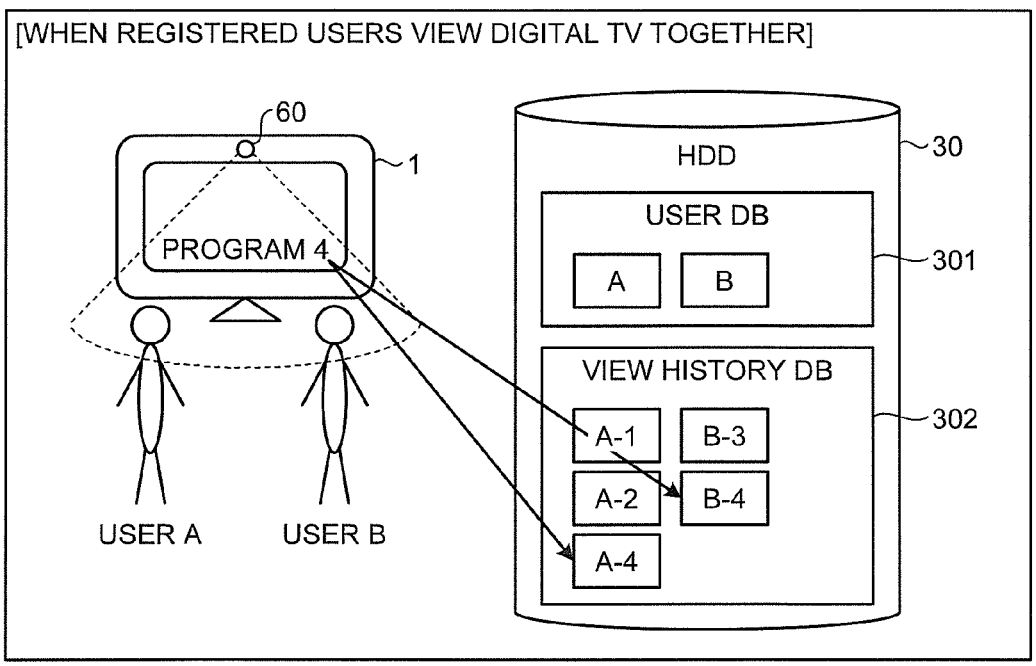
FIG. 24 is an exemplary schematic diagram for explaining the operation when the registered users A and B view a program together on the digital TV in the embodiment.

FIG. 24 is a schematic diagram for explaining the operation when the users A and B view a program together on the digital TV1 after registration. As illustrated in FIG. 24, when the users A and B turn on the digital TV1 with the power key 25a on the remote controller 25 and start viewing a program, the camera 60 captures images of the user A and B. Thus, the users A and B are determined to be already registered in the user DB 301. The digital TV1 registers program data (A-4, B-4) of a program 4 that the users A and B are viewing in the view history DB 302. Further, the digital TV1 searches for programs similar to those viewed by the users A and B in the past based on the view history DB 302. If finding a program similar to those in view history among programs currently being broadcasted or to be broadcasted soon from program guide data in the program guide DB 303, the digital TV1 displays a program advice message suggesting the program on the screen of the LCD panel 3. Incidentally, the program advice message displayed on the LCD panel 3 at this time suggests a recommended program for the user A as well as a recommended program for the user B.

FIG. 25 illustrates the operation and the action of the users A and B illustrated in FIGS. 19, 20, 23, and 24 together with a program guide. That is, FIG. 25 illustrates an example of records of the user DB 301 and the view history DB 302 based on the action of the users A and B.

1. The user A starts viewing a program, and user data of the user A is registered in the user DB 301.

2. The program ends, and the program is recorded as view history of the user A on the view history DB 302. The user A once stops viewing the digital TV1.

3. The user A starts viewing a program again, and a recommended program is searched for the user A.

4. The program ends, and the program is recorded as the view history of the user A on the view history DB 302. The user A stops viewing the digital TV1 again.

5. The user B starts viewing a program, and user data of the user B is registered in the user DB 301.

6. The program ends, and the program is recorded as view history of the user B on the view history DB 302.

7. The user B searches for a program to view by zapping using the numeric keys 25c or the channel up/down key 25d on the remote controller 25. In this case, since the view time is short, programs are not recorded as the view history on the view history DB 302.

8. The user B stops viewing the digital TV1. Since the view time is short, programs are not recorded as the view history on the view history DB 302.

9. The users A and B start viewing a program together, and a recommended program is searched for the users A and B.

10. The program ends, since the view time of the program is long enough, the program is recorded as the view history of the users A and B on the view history DB 302.

In the following, with reference to FIG. 26, a description will be given of the difference in viewing a program between the operation of the digital TV1 as the video output device of the embodiment and that of a conventional broadcast receiver disclosed in Japanese Patent Application Publication (KO-KAI) No. 2003-219287.

First, a description will be given of the operation of the digital TV1 upon viewing a program.

A. A registered user starts viewing a program.

B. The user is informed of a recommended program while viewing the program.

C. After the program ends, the user selects the recommended program and starts viewing it.

D. After the recommended program ends, because not informed of a recommended program, the user searches for a program by zapping.

E. The remote control processor 232 detects the zapping, and a recommended program to be broadcasted is displayed.

F. The user selects the recommended program and continues viewing the digital TV1 until the program starts.

G. After the recommended program ends, because not informed of a recommended program, the user performs power off operation. The remote control processor 232 detects the power off operation, and a recommended program to be broadcasted is displayed.

F. The user selects the recommended program and continues viewing the digital TV1 until the program starts.

G. After the recommended program ends, the user performs power off operation. Because there is no recommended program, the digital TV1 is turned off.

In this manner, according to the embodiment, programs are viewed in the manner as described above. Thus, the user can view all recommended programs.

Next, a description will be given of the operation of the broadcast receiver disclosed in Japanese Patent Application Publication (KOKAI) No. 2003-219287 upon viewing a program.

a. A user starts viewing a program.

b. The channel is not changed to a recommended program while the user is viewing the program.

c. Even the program ends, the channel is not changed to a recommended program until the program end time.

d. The user searches for a program to view by zapping.

e. Having not been able to find a program to view, the user selects some program and starts viewing it.

f. The program ends. Because there is no recommended program, the channel is not changed even after the program end time.

g. The user starts viewing a program on the same channel.

h. The program ends. Because there is no recommended program, the channel is not changed. The user gives up viewing something that interests him/her, and turns off the broadcast receiver.

In this manner, according to the conventional technology, programs are viewed in the manner as described above. As a result, the user cannot view any recommended program. In other words, although the conventional broadcast receiver eliminates the need of setting operation, it cannot prevent the user from missing a recommended program. For example, consider that drama series that the user views every week is starting shortly while the user is viewing a specific program on another channel. In this case, the user does not change the channel in the middle of the program, and he/she misses the drama series. In addition, the conventional broadcast receiver is configured to change the channel upon detecting the end of a program, and the function does not work unless it detects the end of a program. Generally, after a program ends, advertisements or commercial messages are broadcasted until the actual end time of the program. Accordingly, it is often the case that the user changes the channel his/herself before channel change.

As described above, according to the embodiment, the digital TV1 identifies a user who is viewing a program displayed on the LCD panel 3 from video (image) captured by the camera 60. The digital TV1 stores the program that the user is viewing in association with the user as view history, and searches program guide data for a recommended program similar to programs viewed by the user in the past using a keyword based on the view history stored in association with the user. The digital TV1 creates a program advice message and displays it on the LCD panel 3. In this manner, the digital TV1 automatically identifies a user and informs the user of a recommended program. Thus, without setting operation such as to program timer recording, the user is less likely to miss a program that he/she wishes to view.

According to the embodiment, the digital TV1 only informs the user of a recommended program and lets the user select whether to view the program. Besides, the digital TV1 successively searches for a recommended program, and informs the user of the recommended program without fail shortly before the broadcast time of the program. Moreover, the digital TV1 searches for a recommended program and informs the user of the recommended program even if the user is searching for a program (zapping) or stops viewing a program (turns the digital TV1 off).

According to the embodiment, the user identification module 234 is described as extracting face data from an image of a user who is viewing a program captured by the camera 60 (external environmental information), and identifies the user by face recognition based on the face data; however, this is by way of example and not of limitation. The user identification module 234 may obtain voice data of a user who is viewing a program from external environmental information and identify the user by voice recognition based on the voice data.

According to the embodiment, the output signal processor 21 is described as generating an OSD signal from a program advice message created by the program advice module 237 and outputting it as being superimposed on a video signal of a program; however, this is by way of example and not of limitation. For example, the output signal processor 21 may generate an audio signal from a program advice message created by the program advice module 237 and output it from the speaker 22.

According to the embodiment, the remote control processor 232 is described as detecting zapping operation and power off operation using keys on the remote controller 25; however, this is by way of example and not of limitation. Zapping operation and power off operation may be detected in different manners such as, for example, behavior of the user facing the camera 60.

The control program executed on the digital TV1 as the video output device of the embodiment may be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The control program may also be stored in a computer connected via a network such as the Internet so that it can be downloaded therefrom via the network. Further, the control program may be provided or distributed via a network such as the Internet.

The control program includes modules that implement the constituent elements described above (the captured image processor 231, the remote control processor 232, the network processor 233, the user identification module 234, the view history processor 235, the program guide processor 236, the program advice module 237). As real hardware, the CPU (processor) loads the control program from the ROM into the main memory and executes it. Thus, the captured image processor 231, the remote control processor 232, the network processor 233, the user identification module 234, the view history processor 235, the program guide processor 236, the program advice module 237 are implemented on the RAM.

While the above embodiment is described by way of example as being applied to the digital TV1 capable of video output based on a video signal for stereoscopic (three-dimensional) display, it is not so limited. The embodiment may be applied to a digital TV capable of only video output based on a video signal for ordinary planar (two-dimensional) display.

While the above embodiment is described by way of example as being applied to the digital TV1 as a video output device, it may be applied to, for example, HDD recorders, tuners, set-top boxes, and the like.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video output device comprising:
a receiver configured to receive a broadcast signal of a program;
a program guide obtaining module configured to obtain program guide data as event information related to the program;
an output signal processor configured to output a video signal of the program obtained by processing the broadcast signal received by the receiver to an output module;
a user identification module configured to identify a user who is viewing the program output to the output module from external environmental information;
a view history storage module configured to store the program as view history in association with the user identified by the user identification module; and
a program advice module configured to search, in a first search time slot, the program guide data obtained by the program guide obtaining module for a recommended program similar to programs viewed by the user in the past using a keyword based on the view history stored in the view history storage module in association with the user who is viewing the program output to the output module, and to create a program advice message suggesting the recommended program, wherein
the program advice module is configured to search the program guide data for a recommended program in a second search time slot if the program advice module determines that the user identified by the user identification module is searching for a program to view, the second search time slot being set to be longer than the first search time slot, and
the program advice module is configured to search the program guide data for a recommended program in a third search time slot if the program advice module determines that the user identified by the user identification module intends to stop viewing a program, the third search time slot being set to have a length of time remaining in a day after the program advice module determines that the user identified by the user identification module intends to stop viewing the program, and
the program advice module is configured to create the program advice message suggesting the recommended program, and
the output signal processor is configured to output the program advice message created by the program advice module to the output module.

2. The video output device of claim 1, wherein the output signal processor is configured to generate an on-screen display (OSD) signal from the program advice message created by the program advice module and output the OSD signal as being superimposed on the video signal of the program.

3. The video output device of claim 1, wherein the output signal processor is configured to generate an audio signal from the program advice message created by the program advice module and output the audio signal.

4. The video output device of claim 1, wherein the user identification module is configured to extract face data from a captured image of the user who is viewing the program, and to identify the user by face recognition based on the face data.

5. The video output device of claim 1, wherein the user identification module is configured to obtain voice data of the user who is viewing the program, and to identify the user by voice recognition based on the voice data.

6. The video output device of claim 1, wherein
the user identification module is configured to be capable of identifying a plurality of users who are viewing the program, and
if the user identification module identifies a plurality of users who are viewing the program, the program advice module searches the program guide data for a recommended program similar to programs viewed by each of the users in the past, and creates a program advice message suggesting the recommended program for each of the users.

7. The video output device of claim 1, wherein, if there is a plurality of recommended programs, the program advice module creates a program advice message suggesting the recommended programs all together.

8. The video output device of claim 1, wherein, if view time of the program is less than a threshold, the view history storage module does not store the program as view history in association with the user identified by the user identification module.

9. The video output device of claim 1, wherein the program advice module is configured to perform keyword search on title information of the program guide data using title information as the keyword based on the view history stored in the view history storage module in association with the user who is viewing the program output to the output module, and to determine a program with a matching rate equal to or more than a threshold as the recommended program.

10. The video output device of claim 1, wherein the program advice module is configured to perform keyword search on category information of the program guide data using category information as the keyword based on the view history stored in the view history storage module in association with the user who is viewing the program output to the output module, and to determine a program with a matching rate equal to or more than a threshold as the recommended program.

11. The video output device of claim 1, wherein the program advice module is configured to perform keyword search on cast information of the program guide data using cast information as the keyword based on the view history stored in the view history storage module in association with the user who is viewing the program output to the output module, and to determine a program with a matching rate equal to or more than a threshold as the recommended program.

* * * * *